United States Patent
Maurer et al.

(10) Patent No.: US 12,361,567 B1
(45) Date of Patent: Jul. 15, 2025

(54) MULTI-FRAME TEMPORAL AGGREGATION AND DENSE MOTION ESTIMATION FOR AUTONOMOUS VEHICLES

(71) Applicant: Waymo LLC, Mountain View, CA (US)

(72) Inventors: Daniel Rudolf Maurer, Mountain View, CA (US); Kratarth Goel, Fremont, CA (US); Alper Ayvaci, San Jose, CA (US); Vasiliy Igorevich Karasev, San Francisco, CA (US); Hang Yan, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 137 days.

(21) Appl. No.: 18/073,996

(22) Filed: Dec. 2, 2022

(51) Int. Cl.
*G06T 7/246* (2017.01)
*B60W 60/00* (2020.01)
*G06T 3/18* (2024.01)

(52) U.S. Cl.
CPC ........... *G06T 7/248* (2017.01); *B60W 60/001* (2020.02); *G06T 3/18* (2024.01); *B60W 2420/403* (2013.01); *B60W 2420/408* (2024.01); *B60W 2554/404* (2020.02); *G06T 2207/10028* (2013.01); *G06T 2207/10048* (2013.01); *G06T 2207/30261* (2013.01)

(58) Field of Classification Search
CPC . G06T 7/248; G06T 3/18; G06T 2207/10028; G06T 2207/10048; G06T 2207/30261; B60W 60/001; B60W 2420/403; B60W 2420/408; B60W 2554/404
See application file for complete search history.

(56) References Cited

U.S. PATENT DOCUMENTS

| 2019/0147254 A1* | 5/2019 | Bai | G01S 17/86 |
| | | | 382/104 |
| 2020/0025931 A1 | 1/2020 | Liang et al. | |
| 2020/0175315 A1* | 6/2020 | Gowaikar | G01S 7/417 |

(Continued)

OTHER PUBLICATIONS

International Search Report and Written Opinion for International Application No. PCT/US2023/081952, mailed Feb. 23, 2024, 14 Pages.

(Continued)

*Primary Examiner* — Anshul Sood
(74) *Attorney, Agent, or Firm* — LOWENSTEIN SANDLER LLP

(57) ABSTRACT

A method includes obtaining, by a processing device, input data derived from a set of sensors associated with an autonomous vehicle (AV). The input data includes camera data and radar data. The method further includes extracting, by the processing device from the input data, a plurality of sets of bird's-eye view (BEV) features. Each set of BEV features corresponds to a respective timestep. The method further includes generating, by the processing device from the plurality of sets of BEV features, an object flow for at least one object. Generating the object flow includes performing at least one of: multi-frame temporal aggregation or multi-frame dense motion estimation. The method further includes causing, by the processing device, a driving path of the AV to be modified in view of the object flow.

20 Claims, 14 Drawing Sheets

(56) References Cited

U.S. PATENT DOCUMENTS

2021/0004933 A1* 1/2021 Wong .................. G06T 7/174
2021/0150203 A1* 5/2021 Liu ..................... G06T 7/11

OTHER PUBLICATIONS

Zeng Y., et al., "LIFT: Learning 4D LiDAR Image Fusion Transformer for 3D Object Detection," IEEE/CVF Conference on Computer Vision and Pattern Recognition (CVPR), 2022, pp. 17151-17160.

Teed, Zachary and Deng, Jia, Princeton University, "RAFT: Recurrent All-Pairs Field Transforms for Optical Flow", arXiv:2003.12039v3 [cs.CV], Aug. 25, 2020, 21 pages.

Hu, et al., University of Cambridge, UK, "FIERY: Future Instance Prediction in Bird's-Eye View from Surround Monocular Cameras", arXiv:2104.10490v3 [cs.CV] Oct. 18, 2021, 16 pages.

* cited by examiner

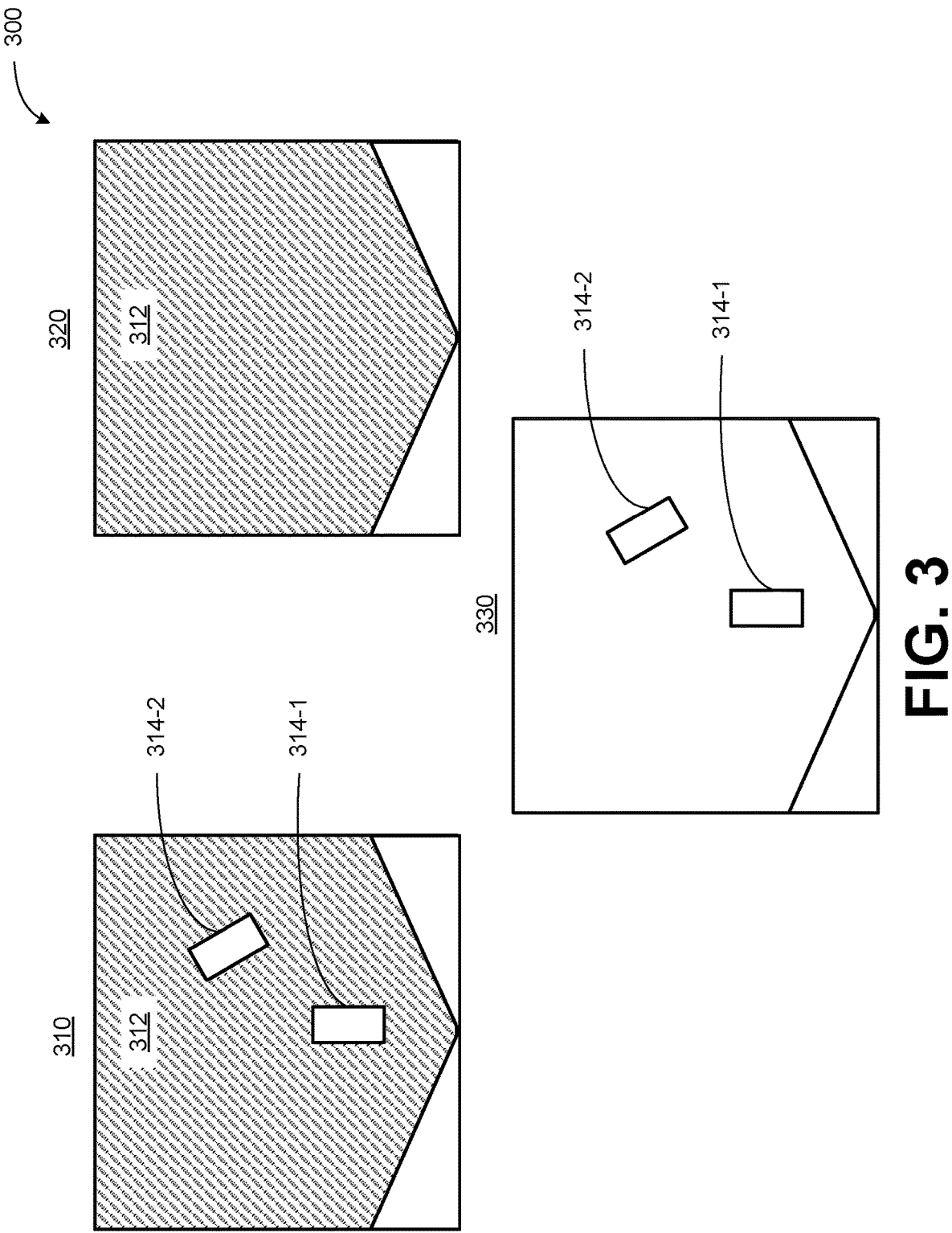

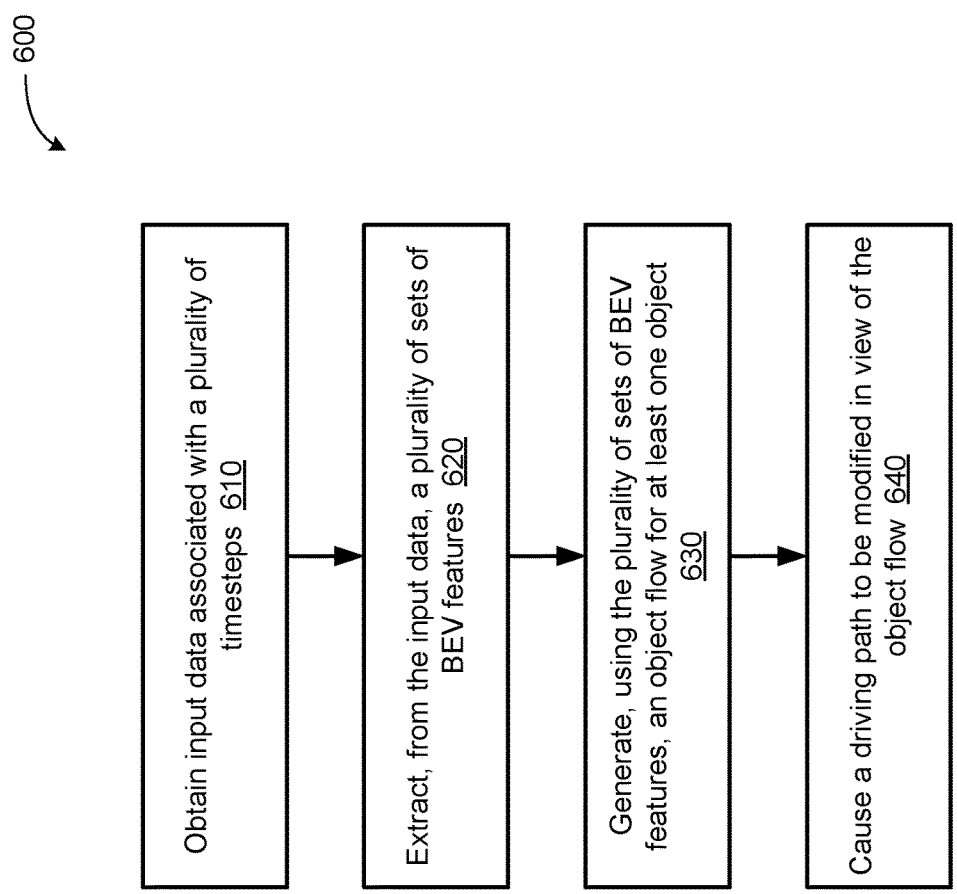

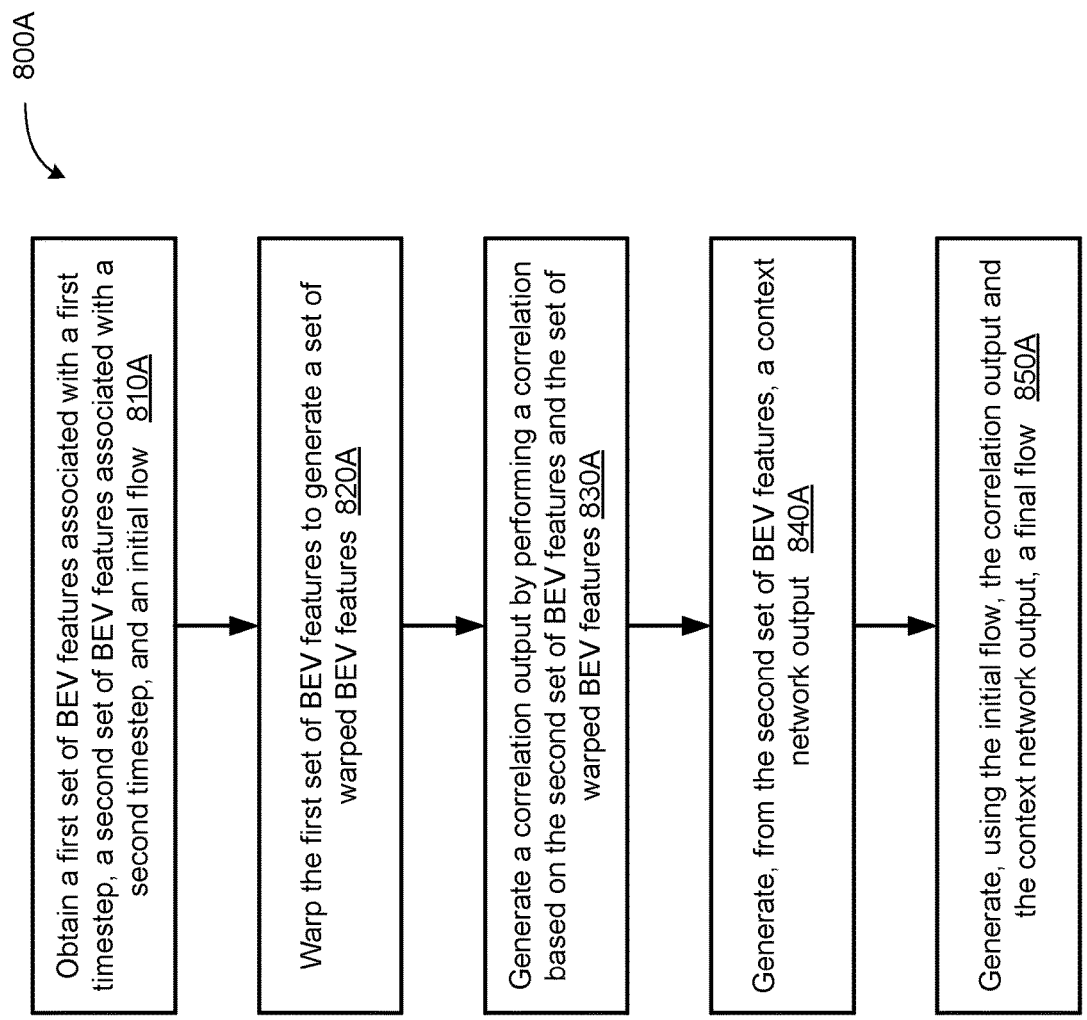

MULTI-FRAME TEMPORAL AGGREGATION AND DENSE MOTION ESTIMATION FOR AUTONOMOUS VEHICLES

TECHNICAL FIELD

The instant specification generally relates to systems and applications that detect and classify objects and, in particular, to autonomous vehicles and vehicles deploying driver assistance technology. More specifically, the instant specification relates to multi-frame temporal aggregation and dense motion estimation for autonomous vehicles (AVs) for faster and more resource-efficient detection of objects, including but not limited to vehicles, pedestrians, bicyclists, animals, and the like.

BACKGROUND

An autonomous (fully or partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Navigation Satellite System (GNSS) data and road map data. While the GNSS and the road map data can provide information about static aspects of the environment (buildings, street layouts, road closures, etc.), dynamic information (such as information about other vehicles, pedestrians, streetlights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 3 is a diagram illustrating example flows, in accordance with some implementations of the present disclosure.

FIG. 6 illustrates an example method of implementing multi-frame temporal aggregation and dense motion estimation for autonomous vehicles (AVs), in accordance with some implementations of the present disclosure.

FIGS. 8A-8B illustrate example methods of implementing dense motion estimation for autonomous vehicles (AVs), in accordance with some implementations of the present disclosure.

SUMMARY

Figure 1:
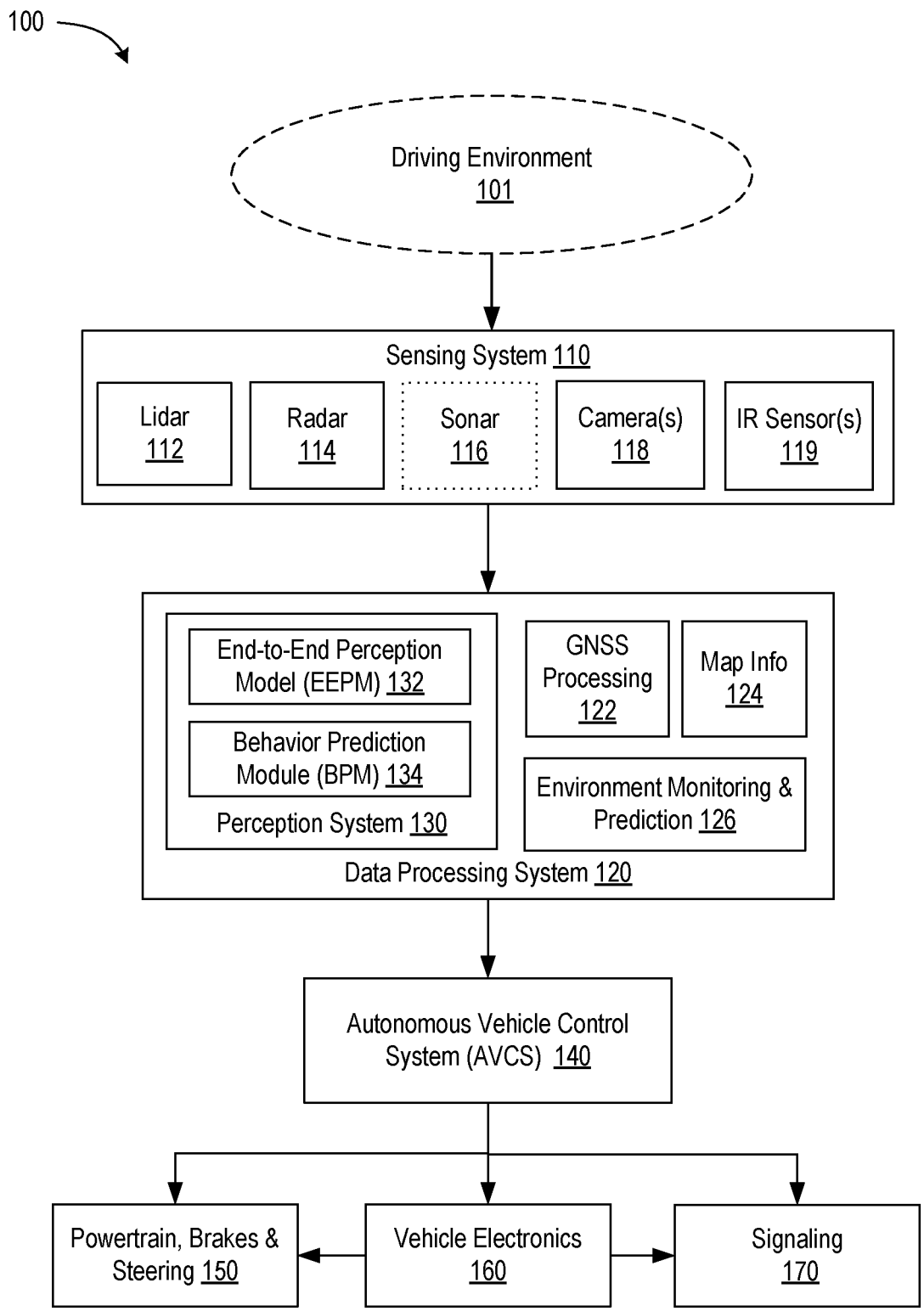
FIG. 1 is a diagram illustrating components of an example autonomous vehicle (AV), in accordance with some implementations of the present disclosure.

In one implementation, disclosed is a method that includes obtaining, by a processing device, input data derived from a set of sensors associated with an autonomous vehicle (AV). The input data includes camera data and radar data. The method further includes extracting, by the processing device from the input data, a plurality of sets of bird's-eye view (BEV) features. Each set of BEV features corresponds to a respective timestep. The method further includes generating, by the processing device from the plurality of sets of BEV features, an object flow for at least one object. Generating the object flow includes performing at least one of: multi-frame temporal aggregation or multi-frame dense motion estimation. The method further includes causing, by the processing device, a driving path of the AV to be modified in view of the object flow.

In another implementation, disclosed is a system that includes a memory and a processing device, operatively coupled to the memory, configured to obtain input data derived from a set of sensors associated with an autonomous vehicle (AV). The input data includes camera data and radar data. The processing device is further configured to extract, from the input data, a plurality of sets of bird's-eye view (BEV) features. Each set of BEV features corresponds to a respective timestep. The processing device is further configured to generate, from the plurality of sets of BEV features, an object flow for at least one object. Generating the object flow includes performing at least one of: multi-frame temporal aggregation or multi-frame dense motion estimation. The processing device is further configured to cause a driving path of the AV to be modified in view of the object flow.

In yet another implementation, disclosed is a non-transitory computer-readable storage medium having instructions stored thereon that, when executed by a processing device, cause the processing device to perform operations including obtaining input data derived from a set of sensors associated with an autonomous vehicle (AV). The input data includes camera data and radar data. The operations further include extracting, from the input data, a plurality of sets of bird's-eye view (BEV) features. Each set of BEV features corresponds to a respective timestep. The operations further include generating, from the plurality of sets of BEV features, an object flow for at least one object. Generating the object flow includes performing at least one of: multi-frame temporal aggregation or multi-frame dense motion estimation. The operations further include causing a driving path of the AV to be modified in view of the object flow.

DETAILED DESCRIPTION

Although various implementations can be described below, for the sake of illustration, using autonomous driving systems and driver assistance systems as examples, it should be understood that the techniques and systems described herein can be used for tracking of objects in a wide range of applications, including aeronautics, marine applications, traffic control, animal control, industrial and academic research, public and personal safety, or in any other application where automated detection of objects is advantageous.

In one example, for the safety of autonomous driving operations, it can be desirable to develop and deploy techniques of fast and accurate detection, classification, and tracking of various road users and other objects encountered on or near roadways, such as road obstacles, construction equipment, roadside structures, and the like. An autonomous vehicle (as well as various driver assistance systems) can take advantage of a number of sensors to facilitate detection of objects in a driving environment and determine the motion of such objects. The sensors typically include radio detection and ranging sensors (radars), light detection and ranging sensors (lidars), digital cameras of multiple types, sonars, positional sensors, and the like. Different types of sensors provide different and often complementary benefits. For example, radars and lidars emit electromagnetic signals (radio signals or optical signals) that reflect from the objects and carry information allowing to determine distances to the objects (e.g., from the time of flight of the signals) and velocities of the objects (e.g., from the Doppler shift of the frequencies of the signals). Radars and lidars can cover an entire 360-degree view, e.g., by using a scanning transmitter of sensing beams. Sensing beams can cause numerous reflections covering the driving environment in a dense grid of return points. Each return point can be associated with the distance to the corresponding reflecting object and a radial velocity (a component of the velocity along the line of sight) of the reflecting object.

Methods of object identification and tracking use various sensing modalities, such as lidars, radars, cameras, etc., to obtain images of the environment. The images can then be processed by trained machine learning models to identify locations of various objects in the images (e.g., in the form of bounding boxes), state of motion of the objects (e.g., speed, as detected by lidar or radar Doppler effect-based sensors), object types (e.g., a vehicle or pedestrian), and so on. Motion of objects (or any other evolution, such as splitting of a single object into multiple objects) can be performed by creating and maintaining tracks associated with a particular object.

Using multiple sensing modalities (e.g., lidars, radars, cameras) to obtain often complementary data improves precision of object detection, identification, and tracking but comes at a substantial cost in sensing hardware and processing software. For example, a lidar sensor can provide valuable information about distances to various reflecting surfaces in the outside environment. A lidar sensor, however, is an expensive optical and electronic device that operates by actively probing the outside environment with optical signals and requires considerable maintenance and periodic calibration. Lidar returns (the point cloud) have to be processed, segmented into groups associated with separate hypothesized objects, and matched with objects detected using other sensing modalities (e.g., cameras), which requires additional processing and memory resources. Cameras, on the other hand, operate by passively collecting light (and/or infrared electromagnetic waves) emitted (or reflected) by objects of the environment and are significantly simpler and cheaper in design, installation, and operations. Consequently, various driver assistance systems that do not deploy lidars (for costs and maintenance reasons) are typically equipped with one or more cameras. Cameras can also be more easily installed at various stationary locations and used for traffic monitoring and control, public and private safety applications, and the like. Being based on optical or infrared imaging technology, cameras have certain advantages over radars, which, while allowing detection of distances to (and velocities of) objects, operate in a range of wavelengths that has intrinsically lower resolution compared with cameras. An ability to detect and identify objects based on camera-only images is, therefore, beneficial.

Cameras, however, produce projections of a three-dimensional (3D) outside environment onto a two-dimensional imaging surface (e.g., an array of camera's light detectors), which may be a plane or a curved surface. This gives rise to two related challenges. On one hand, distances to objects (often referred to depths of the objects in the image) are not immediately known (though can often be determined from the context of the imaged objects). On the other hand, camera images have perspective distortions causing the same number of pixels separating images of objects to correspond to different distances between objects depending on the depths of the objects. Additionally, objects whose depictions are proximate to each other can nonetheless be separated by a significant distance (e.g., a car and a pedestrian visible behind the car). Some machine learning techniques of object detection can attempt to map objects from the perspective view to the top-down view, also known as the bird's-eye view (BEV), in which objects are represented on a convenient manifold, e.g., a plane viewed from above and characterized by a simple set of Cartesian coordinates. Object identification and tracking can subsequently be performed directly within the BEV representation. Success of such techniques depends on accurate mapping of the objects to the BEV representation. This, in turn, requires precise estimates of distances to various objects since misplacing of the objects within the BEV representation can result not only in an error in ascertaining a distance to a road user but may also lead to a loss of important contextual information.

Motion data during operation of an AV can include flow data. For example, flow can be aligned with a most recent timestep (i.e., most recent frame) and can be represented by a per-cell two-dimensional (2D) displacement vector (u, v) computed from consecutive three-dimensional (3D) bounding box labels. Flow can be captured using, e.g., color coding, in which the color of the object identified within an image can designate a direction of object motion and a saturation of the color can designate the speed. For example, a green object can be an object determined to be moving north, a purple object can be an object determined to be moving south, an orange object can be an object determined to be moving west, and a teal object can be an object determined to be moving east.

One example of flow is a base flow, which represents object motion relative to the motion of the AV. Another example of flow is ego flow, which represents the motion of the AV (i.e., object motion relative to the AV, assuming that the objects are static). Another example of flow is object flow, which represents the motion of an object. For example, object flow can represent the absolute displacement of an object relative to the ground. Object flow can be determined as the difference between the base flow and the ego flow. Motion state of an object can be represented by a translation speed of the object.

It may be the case the object flow of an object is not determined in an object-agnostic manner. This can make it difficult to enable classification of objects into known object classes or an "unknown object" class. Therefore, it can be difficult for an AV to track an unknown object's motion until the unknown object is safely out of the driving environment of the AV.

Aspects and implementations of the present disclosure address these and other challenges of the existing technology by enabling methods and systems that can implement multi-frame temporal aggregation and dense motion estimation for AVs. As will be described in further detail herein, the multi-frame temporal aggregation and dense motion estimation can be performed by employing a plurality of sets of bird's eye view (BEV) features, where each set of BEV features is extracted from data corresponding to a respective timestep associated with a respective frame. For example, timesteps can include a current timestep (timestep t) and at least one prior timestep (e.g., timestep t−1). In particular, the disclosed techniques provide for an end-to-end perception model (EEPM) that can include a set of neural networks (NNs) trained to process input data from a set of sensors of an AV. For example, the input data can include camera data. The dense motion estimation can be used to determine (e.g., estimate) object flow (e.g., motion of an object) in an object-agnostic manner. This can enable classification of objects into any known object classes, as well as an "unknown object" class, based on the object patterns of motion. The motion of an unknown object identified by the AV can be tracked by the AV until the object is safely out of the driving environment of the AV.

The EEPM can be trained using sensor dropout scenarios, in which some of the sensors are removed or non-operational (e.g., at least one camera and/or at least one radar). For example, a right-side facing camera can be removed and the information about the objects in the portion of space covered by the right-side facing camera can be provided by other sensing modalities (e.g., lidar and/or radar sensors). Training scenarios can also include a complete dropout of a particular sensing modality, e.g., dropout of lidar data feed, such that all information about the environment is provided by cameras and radars. This trains the output of EEPM to be robust against failure of individual sensors and entire sensing modalities. Depending on computational complexity and sophistication of training, EEPM can be used in various levels of driving automation, including Level 2 driving assistance systems, Level 3 contextual autonomous driving, Level 4 predominantly autonomous driving, Level 5 fully autonomous driving, and other implementations.

Advantages of the described implementations include (but are not limited to) fast and accurate detection, identification, and tracking of objects in a way that avoids large computational overheads of processing of data of multiple sensing modalities. Since the machine learning models trained and deployed as disclosed herein are capable of efficient object detection based on input data (e.g., camera data and radar data), the EEPM models described herein can be deployed on a variety of platforms (e.g., AVs) including systems with modest computational resources.

FIG. 1 is a diagram illustrating components of an example autonomous vehicle (AV) 100, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), spacecraft (controllable objects operating outside Earth atmosphere) or any other self-propelled vehicles (e.g., robots, factory or warehouse robotic vehicles, sidewalk delivery robotic vehicles, etc.) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 101 can include any objects (animate or inanimate) located outside the AV, such as roadways, buildings, trees, bushes, sidewalks, bridges, mountains, other vehicles, pedestrians, piers, banks, landing strips, animals, birds, and so on. The driving environment 101 can be urban, suburban, rural, and so on. In some implementations, the driving environment 101 can be an off-road environment (e.g., farming or other agricultural land). In some implementations, the driving environment 101 can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment 101 can be three-dimensional and can include objects that are capable of moving along all three directions (e.g., balloons, falling leaves, etc.). Hereinafter, the term "driving environment" should be understood to include all environments in which an autonomous motion (e.g., SAE Level 5 and SAE Level 4 systems), conditional autonomous motion (e.g., SAE Level 3 systems), and/or motion of vehicles equipped with driver assistance technology (e.g., SAE Level 2 systems) can occur. Additionally, "driving environment" can include any possible flying environment of an aircraft (or spacecraft) or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical, infrared, radio wave, etc.) and non-electromagnetic (e.g., acoustic) sensing subsystems and/or devices. The sensing system 110 can include one or more lidars 112, which can be a laser-based unit capable of determining distances to the objects and velocities of the objects in the driving environment 101. The sensing system 110 can include one or more radars 114, which can be any system that utilizes radio or microwave frequency signals to sense objects within the driving environment 101 of the AV 100. The lidar(s) 112 and or radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. Each of the lidar(s) 112 and radar(s) 114 can include a coherent sensor, such as a frequency-modulated continuous-wave (FMCW) lidar or radar sensor. For example, lidar(s) 112 and/or radar(s) 114 can use heterodyne detection for velocity determination. In some implementations, the functionality of a ToF and coherent lidar (or radar) is combined into a lidar (or radar) unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 and/or radar 114s can be mounted on AV 100.

Lidar 112 (and/or radar 114) can include one or more optical sources (and/or radio/microwave sources) producing and emitting signals and one or more detectors of the signals reflected back from the objects. In some implementations, lidar 112 and/or radar 114 can perform a 360-degree scanning in a horizontal direction. In some implementations, lidar 112 and/or radar 114 can be capable of spatial scanning along both the horizontal and vertical directions. In some implementations, the field of view can be up to 60 degrees in the vertical direction (e.g., with at least a part of the region above the horizon being scanned with lidar or radar signals). In some implementations (e.g., aerospace applications), the field of view can be a full sphere (consisting of two hemispheres).

The sensing system 110 can further include one or more cameras 118 to capture images of the driving environment 101. Cameras 118 can operate in the visible part of the electromagnetic spectrum, e.g., 300-800 nm range of wavelengths (herein also referred for brevity as the optical range). Some of the optical range cameras 118 can use a global shutter while other cameras 118 can use a rolling shutter. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, for active sound probing of the driving environment 101, e.g., ultrasonic sonars, and one or more microphones for passive listening to the sounds of the driving environment 101. The sensing system 110 can also include one or more infrared range (IR) sensors 119. For example, IR sensor(s) 119 can include an IR camera. IR sensor(s) 119 can use focusing optics (e.g., made of germanium-based materials, silicon-based materials, etc.) that is configured to operate in the range of wavelengths from microns to tens of microns or beyond. IR sensor(s) 119 can include a phased array of IR detector elements. Pixels of IR images produced by IR sensor(s) 119 can be representative of the total amount of IR radiation collected by a respective detector element (associated with the pixel), of the temperature of a physical object whose IR radiation is being collected by the respective detector element, or any other suitable physical quantity.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more components to facilitate detection, classification, and tracking of objects, including an end-to-end perception model (EEPM) 132 that can be used to process data provided by the sensing system 110. More specifically, in some implementations, EEPM 132 can receive data from sensors of different sensing modalities. For example, EEPM 132 can receive images from at least some of lidar(s) 112, radar(s) 114, and (optical range) camera(s) 118, IR sensor(s) 119, sonar(s) 116 and the like. In particular, EEPM 132 can include one or more trained machine-learning models (MLMs) that are used to process some or all of the above data to detect, classify, and track motion of various objects in the driving environment 101. EEPM 132 can use multiple classifier heads to determine various properties of the outside environment, including but not limited to occupation of space with various objects, types of the objects, motion of the objects, identification of objects that can be occluded, relation of the objects to the roadway, to other objects, and to the traffic flow. Various models of EEPM 132 can be trained using multiple sets of images/data, annotated to identify specific features in the respective sensing data. In some implementations, the perception system 130 can include a behavior prediction module (BPM) 134 that predicts future motion of the detected objects (e.g., objects detected by EEPM 132).

The perception system 130 can further receive information from a Global Navigation Satellite System (GNSS) positioning subsystem (not shown in FIG. 1), which can include a GNNS transceiver (not shown), configured to obtain information about the position of the AV relative to Earth and its surroundings. The positioning subsystem can use the positioning data, e.g., GNNS and inertial measurement unit (IMU) data) in conjunction with the sensing data to help accurately determine the location of the AV with respect to fixed objects of the driving environment 101 (e.g., roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data from sonar 116 or data from microphone picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current state of the animated objects, including current locations (coordinates) and velocities of the animated objects. Additionally, the predictions can be based on a history of motion (tracked dynamics) of the animated objects during a certain period of time that precedes the current moment. For example, based on stored data for a first object indicating accelerated motion of the first object during the previous 3-second period of time, the environment monitoring and prediction component 126 can conclude that the first object is resuming its motion from a stop sign or a red traffic light signal. Accordingly, the environment monitoring and prediction component 126 can predict, given the layout of the roadway and presence of other vehicles, where the first object is likely to be within the next 3 or 5 seconds of motion. As another example, based on stored data for a second object indicating decelerated motion of the second object during the previous 2-second period of time, the environment monitoring and prediction component 126 can conclude that the second object is stopping at a stop sign or at a red traffic light signal. Accordingly, the environment monitoring and prediction component 126 can predict where the second object is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with EEPM 132. For example, the environment monitoring and prediction component 126 can track relative motion of the AV and various objects (e.g., reference objects that are stationary or moving relative to Earth).

The data generated by the perception system 130, the GNSS processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the driving environment 101, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, EEPM 132 can determine that images obtained by camera(s) 118 include depictions of an object and can further classify the object as a bicyclist. The environment monitoring and prediction component 126 can track the bicyclist and determine that the bicyclist is travelling with the speed of 15 mph along an intersecting road perpendicular to the direction of the motion of the vehicle. Responsive to such a determination, the BPM 134 can determine that the vehicle needs to slow down to let the bicyclist clear the intersection. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; and (3) engage a brake unit to reduce (while acting in concert with the engine and the transmission) the vehicle's speed. After EEPM 132 and/or the environment monitoring and prediction component 126 determined that the bicyclist has crossed the intersection, the AVCS 140 can output instructions to the powertrain, brakes, and steering 150 to resume the previous speed settings of the vehicle.

The output of EEPM 132 can be used for tracking of detected objects. In some implementations, tracking can be reactive and can include history of poses (positions and orientations) and velocities of the tracked objects. In some implementations, tracking can be proactive and can include prediction of future poses and velocities of the tracked objects. In some implementations, future predictions can be generated by BPM 134, e.g., based at least partially on the output of EEPM 132. In some implementations, tracking-by-detection or instance segmentation can be used instead of building an explicit tracker. For example, an interface of BPM 134 can include, for each object, a history of recent object locations, extents, headings and velocities. In some implementations, flow information can be defined with reference to units of three-dimensional space (voxels). For additional accuracy of prediction, flow information associated with individual voxels can include not only velocities but also kinematic attributes, such as curvature, yaw rate, and the like. Based on this data, BPM 134 can predict future trajectories in a way that is advantageous over a more traditional tracking approach. In some implementations, an alternative approach can be used that deploys a recurrent neural network (RNN) to smooth and interpolate locations and velocities over time, which may be performed similarly to operations of a Kalman filter.

The output of EEPM 132 can be used for vehicle localization. In some implementations, BPM 134 can use lidar-based global mapping that maps an entire region of 3D environment around the vehicle. In some implementations, BPM 134 can deploy a simpler system that uses accelerometry, odometry, GNNS data, as well as camera-based lane mapping to identify the current position of the vehicle relative to the map data.

In different implementations, BPM 134 can have different levels of sophistication depending on the driving environment 101 (e.g., highway driving, urban driving, suburban driving, etc.). In L2 driving assistance implementations ("hands on the wheel"), where the driver is expected at any time to take over the vehicle's control, BPM 134 can have a minimum functionality and be able to predict behavior of other road users within a short time horizon, e.g., several seconds. For example, such predictions can include impeding lane changes by other vehicles ("agents"). BPM 134 can use various cues, such as a turning signal, front wheel turning, a driver turning the head in the direction of a turn, and the like. BPM 134 can determine if such impending lane changes require driver's attention. In the instances where a lane changing agent is sufficiently far from the vehicle, AVCS 140 acting on BPM 134 prediction can change the vehicle's trajectory (e.g., slow the vehicle down) without driver's involvement. In the instances where a change requires immediate driver's attention, BPM 134 can output a signal to the driver indicating that the driver should take over controls of the vehicle.

In L3 driving assistance implementations ("hands off the wheel"), the objective can be to provide an autonomous driving function for at least a certain time horizon (e.g., X seconds), such that if a condition arises that requires the driver's control, this condition will be predicted at least X seconds prior to its occurrence. The map data can further include camera and/or radar images of prominent landmarks (bridges, signs, roadside structures, etc.). In some implementations, BPM 134 of L3 systems may at any given time output two trajectories, Option A and a backup Option B, for X seconds. For example, when traveling on a city street in the rightmost lane of the street, BPM 134 can compute Option A for the vehicle to remain in the rightmost lane and can further compute Option B for the vehicle to move over to the left lane if a parked vehicle veers into the leftmost lane. BPM 134 can predict that within X seconds into the future the left lane is to remain available and continue vehicle operations. At some point, BPM 134 can predict that the left lane has a fast-moving agent that is to move close enough to the vehicle to make the left lane (and thus Option B) unavailable to the vehicle. Having determined that Option B is likely to become unavailable, BPM 134 can call the driver to take control of the vehicle. In yet even more sophisticated systems, where driver's input is not expected (e.g., autonomous L4 driving systems), if Option B disappears, AVCS 140 can stop the vehicle on the side of the road until the driving situation changes favorably.

To achieve reliable predictions, BPM 134 can simulate multiple possible scenarios how different road users can behave in different ways and estimate the probability of various such scenarios and the corresponding outcomes. In some implementations, BPM 134 can use a closed-loop approach and determine a distribution of probabilities that, if the vehicle makes a certain driving path change (or maintains the current driving path), other vehicles are to respond in a certain way, e.g., to yield to the vehicle or to accelerate or otherwise block the vehicle's driving path. BPM 134 can evaluate multiple such scenarios and output probabilities for each or at least some of the scenarios. In some implementations, BPM 134 can use an open-loop approach, in which predictions are made based on the current state of motion of the agents and the changes of the motion of the vehicle do not affect the behavior of other agents. In some implementations, predicted locations of various agents can be represented via future occupancy heat maps. Further details regarding the EEPM 132 will now be described below with reference to FIG. 2.

Figure 2:
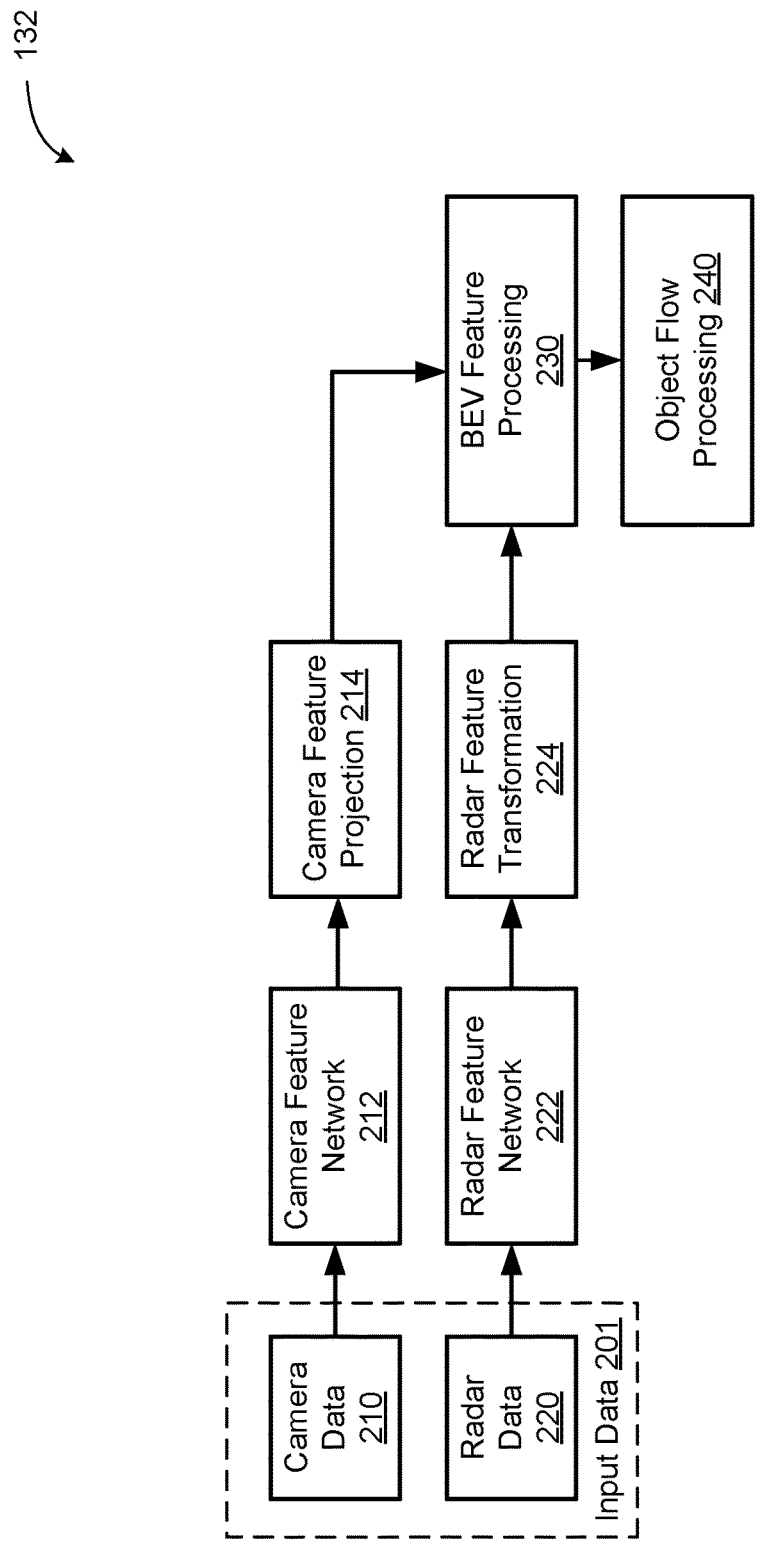
FIG. 2 is a diagram illustrating an example architecture of a part of a perception system that is capable of efficient detection and classification of objects, in accordance with some implementations of the present disclosure.

FIG. 2 is a diagram illustrating example network architecture of an end-to-end perception model (EEPM) 132 that can be deployed as part of a perception system of a vehicle, in accordance with some implementations of the present disclosure. Input data 201 can include data obtained by various components of the sensing system 110 (as depicted in FIG. 1), e.g., lidar(s) 112, radar(s) 114, optical (e.g., visible) range camera(s) 118, IR sensors(s) 119. For example, as shown, the input data 201 can include camera data 210 and radar data 220. Although not shown, the input data 201 can further include, e.g., lidar data.

The input data 201 can include images and/or any other data, e.g., voxel intensity, velocity data associated with voxels, as well as metadata, such as timestamps. The input data 201 can include directional data (e.g., angular coordinates of return points), distance data, and radial velocity data, e.g., as can be obtained by lidar(s) 112 and/or radar(s) 114. Additionally, the input data 201 can further include roadgraph data stored by (or accessible to) perception system 130, e.g., as part of map information 124. Roadgraph data can include any two-dimensional maps of the roadway and its surrounding, three-dimensional maps (including any suitable mapping of stationary objects, e.g., identification of bounding boxes of such objects). It should be understood that this list of input data 201 is not exhaustive and any suitable additional data can be used as part of input data 201, e.g., IMU data, GNNS data, and the like. Each of the modalities of input data 201 can be associated with a specific instance of time when the data was acquired. A set of available data (e.g., a lidar image, a radar image, a camera image, and/or an IR camera image, etc.) associated with a specific instance of time can be referred to as a sensing frame. In some implementations, the images obtained by different sensors can be synchronized, so that all images in a given sensing frame have the same (up to an accuracy of synchronization) timestamp. In some implementations, some images in a given sensing frame can have (controlled) time offsets.

An image obtained by any of sensors can include a corresponding intensity map $I(\{x_j\})$ where $\{x_j\}$ can be any set of coordinates, including three-dimensional (spherical, cylindrical, Cartesian, etc.) coordinates (e.g., in the instances of lidar and/or radar images), or two-dimensional coordinates (in the instances of camera data). Coordinates of various objects (or surfaces of the objects) that reflect lidar and/or radar signals can be determined from directional data (e.g., polar $\theta$ and azimuthal $\phi$ angles in the direction of lidar/radar transmission) and distance data (e.g., radial distance R determined from the ToF of lidar/radar signals). The intensity map can identify intensity of sensing signals detected by the corresponding sensors. Similarly, lidar and/or radar sensors can produce Doppler (frequency shift) map, $\Delta f(\{x_j\})$ that identifies radial velocity of reflecting objects based on detected Doppler shift $\Delta f$ of the frequency of the reflected radar signals, $V=\lambda \Delta f/2$, where $\lambda$ is the lidar/radar wavelength, with positive values $\Delta f > 0$ associated with objects that move towards the lidar/radar (and, therefore, the vehicle) and negative values $\Delta f < 0$ associated with objects that move away from the lidar/radar. In some implementations, e.g., in driving environments where objects are moving substantially within a specific plane (e.g., ground surface), the radar intensity map and the Doppler map can be defined using two-dimensional coordinates, such as the radial distance and azimuthal angle: $I(R, \phi)$, $\Delta f(R, \phi)$.

A camera feature network 212 can receive the camera data 210 and extract a set of camera data features from the camera data 210. For example, the set of camera data features can include a set of camera data feature vectors. More specifically, a camera data feature can be two-dimensional (2D) camera data feature. Camera data feature network 212 can use any suitable perspective backbone(s) to obtain the set of camera data features. Examples of suitable perspective backbones include Resnet, EfficientNet, etc. In some implementations, each camera sensor (e.g., front-facing camera, rear-facing camera, etc.) can use the same vision backbone (e.g., same shared weights). Training camera data feature network 212 using a common backbone can be advantageous as it prevents the network from learning to rely on cameras of specific fields of view. Training camera data feature network 212 using the common backbone can facilitate resilience of EEPM 132 against various vehicle pose abnormalities, such as vehicle yaws, rolls, etc. Each camera data feature can be associated with a particular pixel or a cluster of pixels. Each pixel (or a cluster of pixels) may be associated with a respective depth distribution and a respective depth feature. In some implementations, the processed camera data can be downsampled for computational efficiency. In some implementations, pseudo-cameras can be used. Pseudo-cameras represent crops of the images from the full resolution images to provide finer detail for long range tasks. The pseudo-cameras can have a fixed crop or a crop that is driven from an output of the coarse resolution backbone. In some implementations, the crops can be trained directly. In some implementations, differentiable cropping can be used to train the attention mechanism end-to-end.

Camera data features can be provided to a camera data feature projection component 214. The camera data feature projection component 214 can utilize camera data feature projection to transform the set of camera data features into a set of pixel points. For example, the set of pixel points can be a pixel point cloud. In some implementations, utilizing camera data feature projection includes performing a lift transformation with respect to 2D camera data (e.g., from 2D backbones, sensor intrinsics and extrinsics (or derived intrinsics and extrinsics for pseudo-cameras)). To do so, the camera data feature transformation component 214 can project the 2D camera data to a three-dimensional (3D) space. This projection can be done using various depth distribution techniques. During training, depth ground truths can be available from other sensor data (e.g., lidar data) and can be used as a structured loss. Output of other sensors that can provide 2D images (e.g., IR cameras) can be processed using the same (or similar) architecture. Accordingly, the camera data feature projection component 214 can provide a lifted camera "context" combined across the cameras of the AV. Further details regarding generating the set of pixel points will be described below with reference to FIG. 3.

More specifically, the lift transformation can combine depth distributions and the set of camera features (e.g., feature vectors). As an illustrative example, the lift transformation can supplement each pixel w, h, described by a feature vector $FV(c)_{w,h}$ with depth information from depth distributions. For example, the lift transformation can compute an outer product of each feature vector $FV(c)_{w,h}$ (of dimensions C×1) with the corresponding depth distribution $P(d)_{w,h}$ (of dimensions D×1) for the same pixel. The output of the lift transformation can be a feature that can be represented by, e.g., $FV(c)_{w,h} \otimes P(d)_{w,h} = FT(c, d)_{w,h}$ for pixel w, h.

Feature tensors $FT(c, d)_{w,h}$ computed for individual pixels can then be used to obtain a combined feature tensor for the whole image, e.g., by concatenating feature tensors for different pixels: $\{FT(c,d)_{w,h}\} \rightarrow CFT(c, d, w, h)$. The combined feature tensor CFT(c, d, w, h) has dimensions C×D×W×H. The combined feature tensor can then undergo a 2D mapping. More specifically, 2D mapping can produce a projected feature tensor that uses a convenient set of plane coordinates, e.g., Cartesian coordinates x and y or polar coordinates r and $\theta$ within the plane of the ground.

2D mapping can be a two-part transformation. During the first part, perspective coordinates d, w, h can be transformed into 3D Cartesian coordinates d, w, h→x, y, z (or 3D cylindrical coordinates, w, h→r,$\theta$,z), with z being the vertical coordinate (in the direction perpendicular to the ground). The transformation d, w, h→x, y, z can be a projective transformation, parameterized with a focal length of the camera, direction of the optical axis of the camera, and other similar parameters. In the instances where images are acquired by multiple cameras (or a camera with a rotating optical axis), the transformation d, w, h→x, y, z can include multiple projective transformations, e.g., with a separate transformation used for pixels w, h provided by different cameras.

During the second part, 2D mapping can project the combined feature tensor expressed in the new coordinates, CFT(c, x, y, z), onto a horizontal surface to obtain a projected (BEV) feature tensor. For example, to obtain the C×W×H projected feature tensor PCT(c, x, y), the combined feature tensor can be summed (or averaged) over elements associated with each vertical pillar of pixels, e.g., PCT(c,x,y)=$\Sigma_i$CFT(c,x,y,$z_i$). In some implementations, the summation over coordinates $z_i$ can be performed with different weights $w_i$ assigned to different coordinates $z_i$: PCT(c,x,y)=$\Sigma_i w_i$×CFT(c,x,y,$z_i$), e.g., with larger weights $w_i$ assigned to pixels that image objects within a certain elevations from the ground (e.g., up to several meters) and lower weights assigned to other elevations (e.g., to eliminate spurious objects, such as tree branches, electric cables, etc., that do not obstruct motion of vehicles). The projected feature tensor can characterize objects and their locations in the BEV in which perspective distortions have been reduced (e.g., eliminated).

A radar data feature network 222 can receive the radar data 220 and extract a set of radar data features from the radar data 220. For example, a radar data feature can be generated for each radar. Radar data feature network 222 can use any suitable radar backbone(s). Examples of suitable radar backbones include PointPillars, Range Sparse Net, etc. Each radar modality (e.g., intensity, second returns, Doppler shift, radar cross section) can have a different radar backbone and a feature generation layer. In some implementations, full periods (spins) of lidar/radar sensors can be used to obtain radar data features. In some implementations, portions of radar periods can be used to obtain radar data features. Processing of portions of such periods can allow EEPM 132 to react faster to new agents (e.g., vehicles, pedestrians, etc.) or sudden movements of existing agents in some cases and operate at the rate of the fastest sensor.

The set of radar data features can be provided to a radar data feature transformation component 224. The radar data feature transformation component 214 can utilize radar data feature transformation to transform the set of radar data features into a set of radar points. For example, the set of radar points can be a radar point cloud. Further details regarding generating the set of radar points will be described below with reference to FIG. 3.

The set of pixel points generated by the camera data feature projection component 214 and the set of radar points generated by the radar data feature transformation component 224 can be provided to a BEV feature processing component 230. The BEV feature processing component 230 can generate, for each timestep, a respective set of BEV features. Each set of BEV features can be integrated within a BEV grid (e.g., a BEV voxel grid). It may be the case that the radar data features of the set of radar data features have a coordinate representation not suitable for integration into a BEV grid. Thus, in some implementations, performing the radar data feature transformation can include transforming the coordinate representation of the set of radar data features to a suitable coordinate representation for integration into a BEV grid. For example, the suitable coordinate representation can be a Cartesian coordinate representation. Illustratively, the radar data feature network 222 can process the radar data 220 in a polar coordinate representation, and transforming the coordinate representation includes transforming from the polar coordinate representation to the Cartesian coordinate representation.

The BEV feature processing component 230 can perform multi-frame temporal aggregation to generate a set of aggregated BEV features from a plurality of sets of BEV features. More specifically, the plurality of sets of BEV features can include a set of BEV features corresponding to the current timestep (e.g., t), and one or more BEV features each corresponding to a respective timestep prior to the current timestep (e.g., t−1 and t−2). For example, aggregating the sets of BEV features can include warping each set of BEV features corresponding to a timestep prior to the current timestep. The warping is performed to maintain the position of static objects across the sets of BEV features, which can account for the change of position of the AV over time. This can enable improved prediction of object motion by factoring out the ego motion of the AV. Accordingly, the warping can align features that are to be combined to generate the set of aggregated BEV features.

In some implementations, and as will be described below with reference to FIG. 4A, the set of aggregated BEV features is a set of concatenation-based BEV features. In some implementations, and as will be described below with reference to FIG. 4B, the set of aggregated BEV features is a set of summation-based BEV features. In some implementations, and as will be described below with reference to FIG. 4C, the set of aggregated BEV features is a set of transformer-based BEV features.

The output of BEV feature processing component 230 (e.g., each set of BEV features) can then be provided to an object flow processing component 240. The object flow processing component 240 can perform multi-frame dense motion estimation to generate an object flow (e.g., motion of one or more objects) using a plurality of sets of BEV features. More specifically, the object flow can be an object flow prediction.

In some implementations, the object flow processing component 240 includes a correlation network. For example, the object flow processing component can include multiple BEV feature networks (e.g., BEV backbones), where each BEV feature network receives a respective set of BEV features for a respective timestep. For example, a first BEV feature network can receive the set of BEV features corresponding to the current timestep (e.g., the set of BEV features corresponding to timestep t), and a second BEV feature network can receive a set of BEV features corresponding to a previous timestep (e.g., a set of warped BEV features corresponding to timestep t−1). The output of the BEV features networks (i.e., features extracted from the respective sets of BEV features) can be correlated to generate a correlation output. For example, the correlation output can include a cost volume. Additionally, the object flow processing component 240 can further include a context network to receive the set of BEV features corresponding to the current timestep, and generate a context network output. The object flow processing component 240 can further include a flow estimation network that can receive a set of data including the correlation output, the context network output, and an initial flow, and obtain a final flow from the set of data. In some implementations, the initial flow corresponds to a zero-flow field. More specifically, the flow estimation network can determine a sequence of flows in which the initial flow is an initial flow of the sequence and the final flow is a final flow of the sequence. Further details regarding these implementations will be described below with reference to FIGS. 5A-5B.

In some implementations, the object flow processing component 240 includes a BEV feature network to extract features from a set of BEV features (e.g., a set of aggregated BEV features) and a flow classification head ("flow head") to generate the object flow from the extracted features. For example, the BEV feature network can include a BEV backbone. The flow head can output any suitable representation of object flow that corresponds to various voxels of space (e.g., using motion vectors or the like). For example, for a 2D BEV grid, the flow head can output a 2D vector per grid point. This 2D vector can describe displacement with respect to a previous frame along the height (H) and width (W) axes in terms of the 2D BEV grid. In case of an ego motion compensated version of object flow, the displacement can be in terms of a grid fixed to the reference time step (so static parts of the world have a zero displacement vector). This can similarly be extended to 3D as well. Further details regarding these implementations will be described in further detail below with reference to FIG. 5C.

The EEPM 132 can include one or more additional feature networks (not shown). For example, the EEPM 132 can include a roadgraph feature network that can process roadgraph data and output roadgraph features that can include lanes and lane markings, road edges and medians, traffic lights and stop signs, crosswalks and speed bumps, driveways, parking lots and curb restrictions, railroad crossings, school zones, and zones inaccessible to traffic. Roadgraph features can be voxelized into coordinate frames. Roadgraph data can further include an elevation map. Such prior data can be treated as separate modalities. Such a framework can make it easier to incorporate new location-based data, such as a heatmap of object occurrences observed in previous runs. Roadgraph data can be accumulated during previous driving missions for a particular route. In some instances, where prior data is not available, roadgraph data can be limited by available map information 124 for a particular route. As with other modalities, roadgraph data can be missing, and during training EEPR 132 can be forced to learn to incorporate road graph data additively rather than rely on such data.

FIG. 3 is a diagram 300 illustrating example flows, in accordance with some implementations of the present disclosure. The diagram 300 shows a base flow 310, which represents AV motion 312 and object motion of objects 314-1 and 314-2 observed within a driving environment. The diagram 300 further shows ego flow 320, which represents the AV motion 312 (assuming all objects are static). The diagram 300 further shows an object flow 330, which represents the objection motion of objects 314-1 and 314-2. For example, the object flow 330 can be determined as the difference between the base flow 310 and the ego flow 320.

Figure 4A:
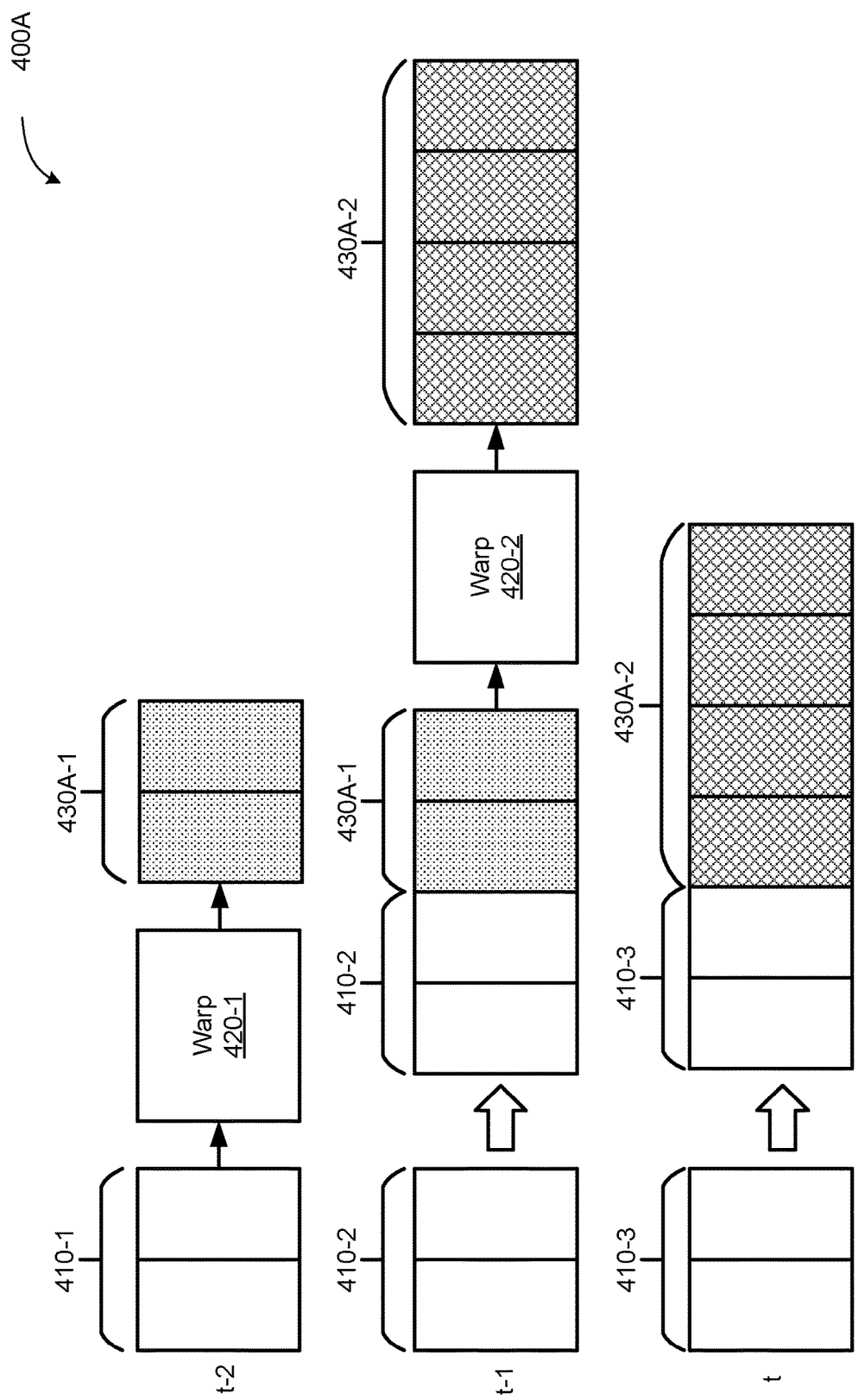
FIGS. 4A-4C are diagrams illustrating example multi-frame temporal aggregation architectures, in accordance with some implementations of the present disclosure.

FIG. 4A is a diagram illustrating an example temporal aggregation model architecture ("architecture") 400A, in accordance with some implementations of the present disclosure. More specifically, the architecture 400A depicts a concatenation-based temporal aggregation model architecture. The architecture 400A can utilize a constant per-grid cell weight.

As shown, a set of BEV features 410-1 corresponding to timestep t−2, a set of BEV features 410-2 corresponding to timestep t−1, and a set of BEV features 410-3 corresponding to timestep t (i.e., the current timestep) can be obtained. More specifically, each set of BEV features 410-1 through 410-3 can be generated from a respective combination of camera data features and radar data features extracted from camera data and radar data, respectively, as described above with reference to FIG. 2. Although only three sets of BEV features corresponding to three timesteps are shown in FIG. 4A, the architecture 400A can be used with any suitable number of sets of BEV features in accordance with implementations described herein.

The set of BEV features 410-1 can be provided as input to a warp component 420-1 to warp the set of camera data features and generate a set of warped BEV features 430A-1. More specifically, the warping is performed to a common reference timestep, which can be the current timestep t. Warping can be a mathematical transformation that eliminates the (independently known) motion of the sensing system (e.g., the ego motion of the autonomous vehicle). In some implementations, the set of warped BEV features 430A-1 includes a warped feature vector. As a result of the warping, objects that are at rest relative to the ground can be described by elements of the set of warped BEV features 430A-1 that are associated with the same coordinates x, y, whereas moving objects will be described by elements that are spread out along directions of object motion.

The set of warped BEV features 430A-1 can be concatenated with the set of BEV features 410-2 to generate a first set of concatenation-based BEV features. The first set of concatenation-based BEV features can be provided as input to a warp component 420-2 to generate a set of warped BEV features 430A-2. In some implementations, the set of warped BEV features 430A-2 includes a warped feature vector.

The set of warped BEV features 430A-2 can be concatenated with the set of BEV features 410-3 to generate a second set of concatenation-based BEV features. The second set of concatenation-based BEV features can then be provided to the BEV feature processing component 240 for further processing, as described above with reference to FIG. 2.

Figure 4B:
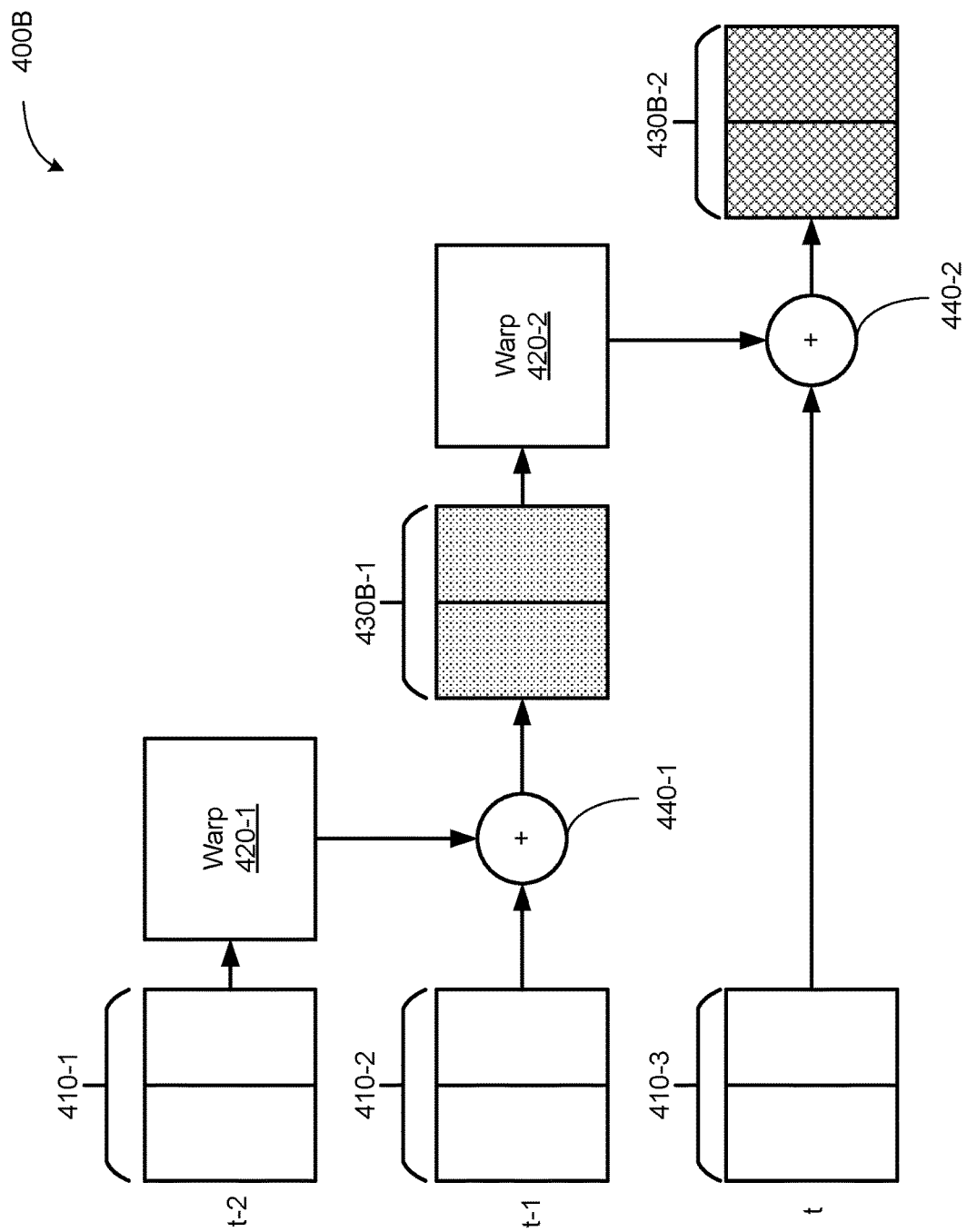

FIG. 4B is a diagram illustrating an example temporal aggregation model architecture ("architecture") 400B, in accordance with some implementations of the present disclosure. More specifically, the architecture 400B depicts a summation-based temporal aggregation model architecture.

As shown, the set of BEV features 410-1, the set of BEV features 410-2 and the set of BEV features 410-3 can be obtained, as described above with reference to FIG. 4A. Although only three timesteps are shown in FIG. 4B, the architecture 400B can be used with any suitable number of timesteps in accordance with implementations described herein.

Similar to the architecture 400A described above with reference to FIG. 4A, the set of BEV features 410-1 can be provided as input to the warp component 420-1. In contrast to the architecture 400A described above with reference to FIG. 4A, the set warped BEV features output by the warp component 420-1 can be combined with the set of BEV features 410-2 at an adder 440-1 to generate a set of summation-based BEV features 430B-1. More specifically, the summation can be a weighted sum. The weight can be a constant per-grid cell weight. The set of summation-based BEV features 430B-1 can be provided as input to the warp component 420-2. The set warped BEV features output by the warp component 420-2 can be combined with the set of BEV features 410-3 at an adder 440-2 to generate a set of summation-based BEV features 430B-2. The set of summation-based BEV features 430B-2 can then be provided to the BEV feature processing component 240 for further processing, as described above with reference to FIG. 2.

Figure 4C:
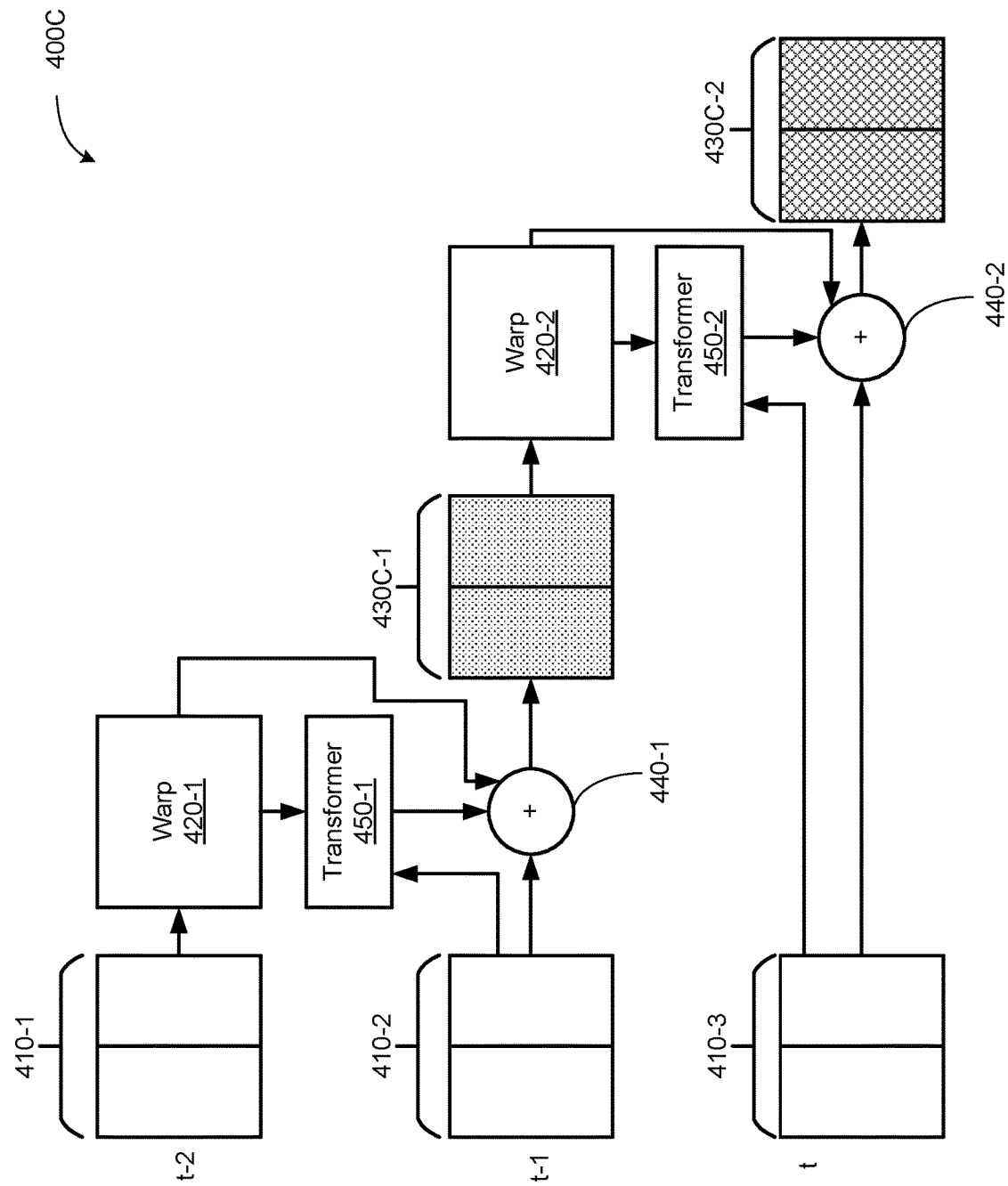

FIG. 4C is a diagram illustrating an example temporal aggregation model architecture ("architecture") 400C, in accordance with some implementations of the present disclosure. More specifically, the architecture 400C depicts a summation-based temporal aggregation model architecture with transformers. The architecture 400C can be used to determine (e.g., predict) per-grid cell weight, instead of using a constant per-grid cell weight as described above with respect to the architectures 400A and 400B.

As shown, the set of BEV features 410-1, the set of BEV features 410-2 and the set of BEV features 410-3 can be obtained, as described above with reference to FIG. 4A. Although only three timesteps are shown in FIG. 4C, the architecture 400B can be used with any suitable number of timesteps in accordance with implementations described herein.

Similar to the architecture 400A described above with reference to FIG. 4A and the architecture 400B described above with reference to FIG. 4B, the set of BEV features 410-1 can be provided as input to the warp component 420-1. In contrast to the architecture 400A described above with reference to FIG. 4A and the architecture 400B described above with reference to FIG. 4B, the set warped BEV features output by the warp component 420-1 can be provided to a transformer 450-1. The transformer 450-1 can be used to determine (e.g., predict) a per-grid cell weight to use during a subsequent summation, as opposed to the constant per-grid cell weight used for generating the set of summation-based BEV features described above with reference to FIG. 4B. More specifically, the transformer 450-1 can predict how the set of warped BEV features should be weighted against the set of BEV features 410-2 and/or how they should be aggregated.

The output of the transformer 450-1 (e.g., weight) can then be used by the adder 440-1 to generate a set of transformer-based BEV features 430C-1. The set of transformer-based BEV features 430C-1 can be provided as input to the warp component 420-2. The set warped BEV features output by the warp component 420-2 can be provided to a transformer 450-2. The output of the transformer 450-2 (e.g., weight) can then be used by the adder 440-2 to generate a set of transformer-based BEV features 430C-2. The set of transformer-based BEV features 430C-2 can then be provided to the BEV feature processing component 240 for further processing, as described above with reference to FIG. 2.

Figure 5A:
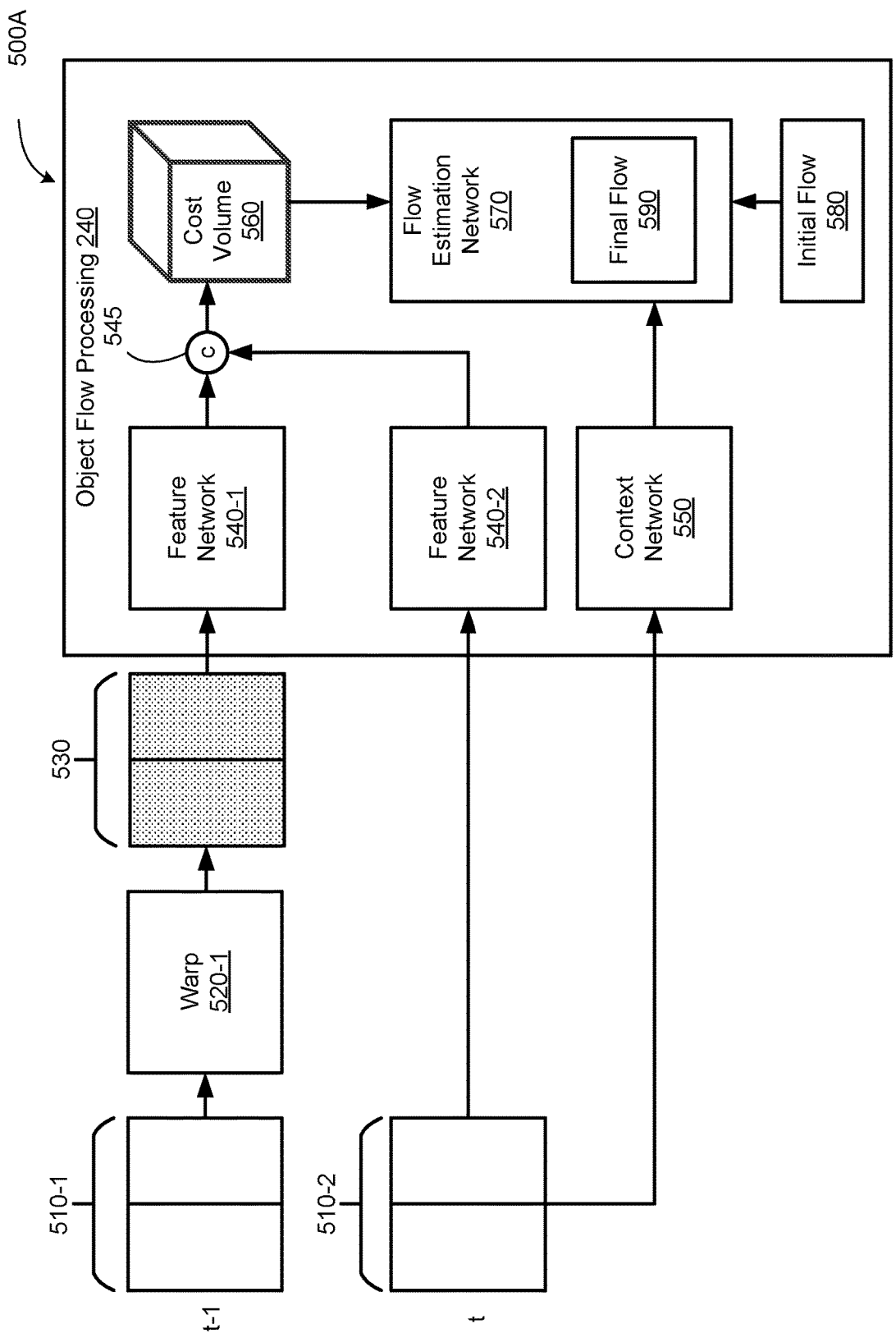
FIGS. 5A-5C are diagrams illustrating example multi-frame dense motion estimation architectures, in accordance with some implementations of the present disclosure.

FIG. 5A is a diagram illustrating an example multi-frame flow model architecture ("architecture") 500A, in accordance with some implementations of the present disclosure. The architecture 500A can be used to perform dense motion estimation to determine (e.g., estimate) the speeds of objects. For example, the output of the architecture 500A can be used to determine motion vectors (e.g., velocity vectors) to determine object flow. The dense motion estimation can allow objects observed within the driving environment to be classified among any known classes of object as well as an "unknown object" class (e.g., based on the object's pattern of motion). An unknown object's motion can be tracked until the object is safely out of the driving environment. As will be described in further detail, the architecture 500A is a specialized architecture that can compute feature correlations among multiple frames.

As shown, a set of BEV features 510-1 and a set of BEV features 510-2 can be obtained. More specifically, the set of BEV features 510-1 can correspond to timestep t−1 and the set of BEV features 510-2 can correspond to timestep t. The set of BEV features 510-1 can be provided as input to a warp component 520-1 to generate a set of warped BEV features 530. In some implementations, the set of warped BEV features 530 includes a warped feature vector.

As further shown, the architecture 500A can further include the object flow processing component 240. More specifically, the object flow processing component 240 can include feature networks 540-1 and 540-2, a correlator 545, a context network 550, and flow estimation network 570.

The set of warped BEV features 530 can be provided to the feature network 540-1 and the set of BEV features 510-1 can be provided to the feature network 540-2. The outputs of the feature networks 540-1 and 540-2 (i.e., extracted features) can be provided to the correlator 545 to generate a feature correlation that is used to generate a correlation output 560. The correlation output 560 measures a similarity between the features extracted by the feature networks 540-1 and 540-2.

In some implementations, and as shown in FIG. 5A, the correlation output 560 is a cost volume generated from the outputs of the feature networks 540-1 and 540-2. Generally, the cost volume can represent an all-pair correlation volume between a pair of objects of a given dimension. In some embodiments, the cost volume is a four-dimensional (4D) cost volume. A 4D cost volume can represent an all-pair correlation volume between a pair of 2D objects. For example, assume that a pair of BEV grids including a first BEV grid and a second BEV grid each having dimensions (H×W). For each grid point in the first BEV grid, the correlation to all other points in the second BEV grid can be computed and stored in the 4D cost volume. Thus, the 4D cost volume can have dimensions (H×W)×(H×W).

Moreover, the set of BEV features 510-2 can be provided to the context network 550 to generate a context network output. The context network 550 can include a convolutional neural network (CNN) for feature extraction that can maintain contextual information. The context information can include contextual details regarding the driving environment. For example, the contextual information can indicate which parts of a BEV feature (e.g., grid cells of a BEV grid) belong to a moving object within the driving environment as they would share a similar flow and/or displacement.

As will be described in further detail below with reference to FIG. 5B, the correlation output 560, the context network output and an initial flow 580 can be provided to a flow estimation network 570 to generate a final flow 590. In some implementations, the initial flow 580 corresponds to a zero-flow field. More specifically, the final flow 590 can be generated by obtaining a sequence of flow estimates starting from the initial flow 560.

Figure 5B:
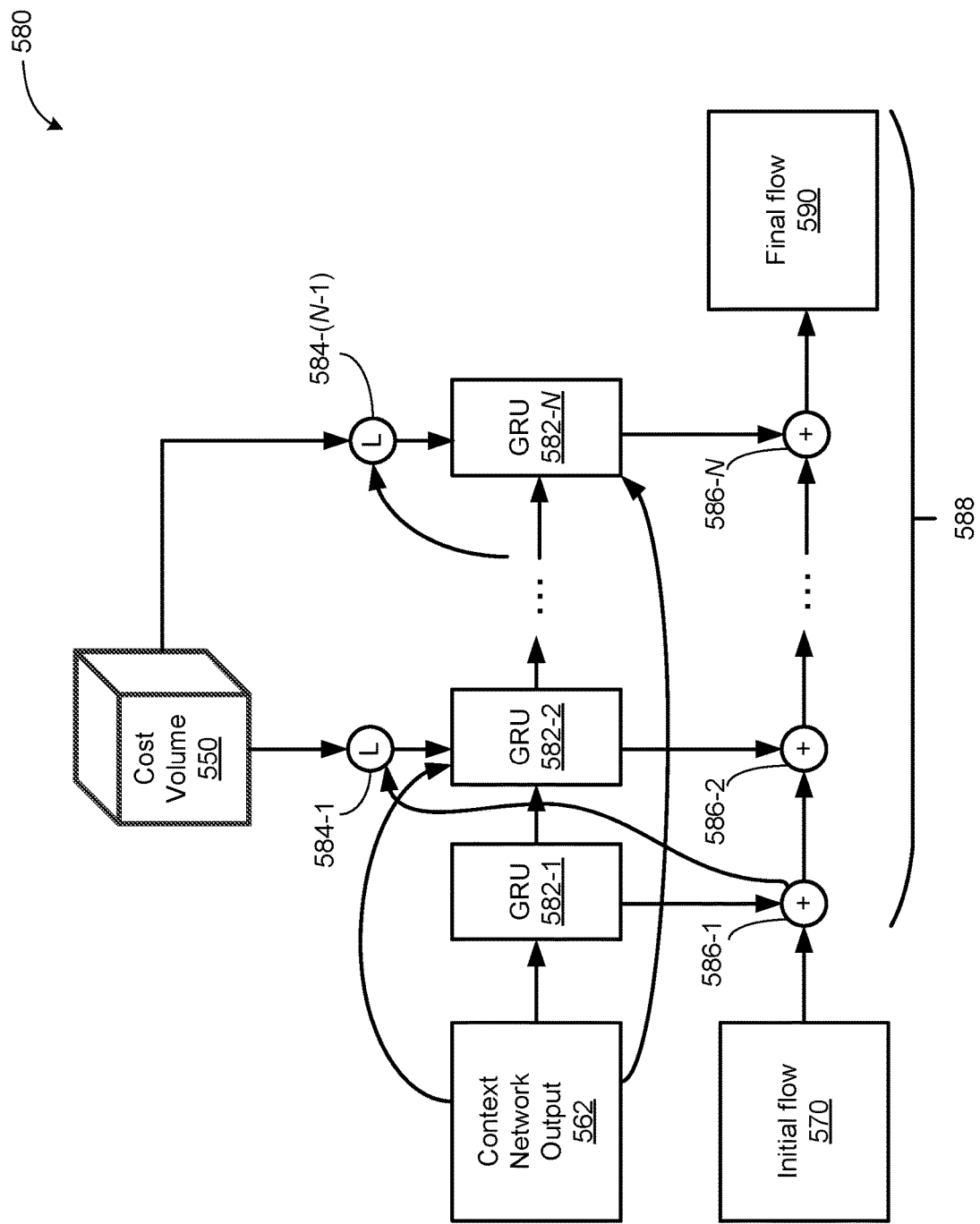

FIG. 5B is a diagram illustrating an example flow estimation network 570 of the architecture 500, in accordance with some implementations of the present disclosure. More specifically, the flow estimation network 570 can implement a recurrent neural network architecture. For example, the flow estimation network 570 can include a set of gated recurrent units (GRUs) 582-1 through 582-N, a set of lookup components 584-1 through 584-(N−1), and a set of adders 586-1 through 586-N. Lookup refers to which features are sampled from the correlation output 560 (e.g., 4D cost volume).

As shown, a context network output 592 (e.g., the output of the context network 550) can be provided as input to the GRU 582-1. The output of the GRU 582-1 can be combined with the initial flow 580 at the adder 586-1 to generate a first flow estimate of a sequence of flow estimates 588 (i.e., update the initial flow 580 with the output of the GRU 582-1). To generate a second flow estimate of the sequence of flow estimates 588, the cost volume 560 and the first flow estimate output by the adder 586-1 can be provided as input to the lookup component 584-1. The output of the lookup component 584-1 and the output of the GRU 582-1 can be provided as input to the GRU 582-2. The output of the GRU 582-2 can be combined with the output of the adder 586-1 at the adder 586-2 to generate the second flow estimate. A similar process can be performed to generate the remaining flow estimates of the sequence of flow estimates, until the final flow 590 is generated.

Figure 5C:
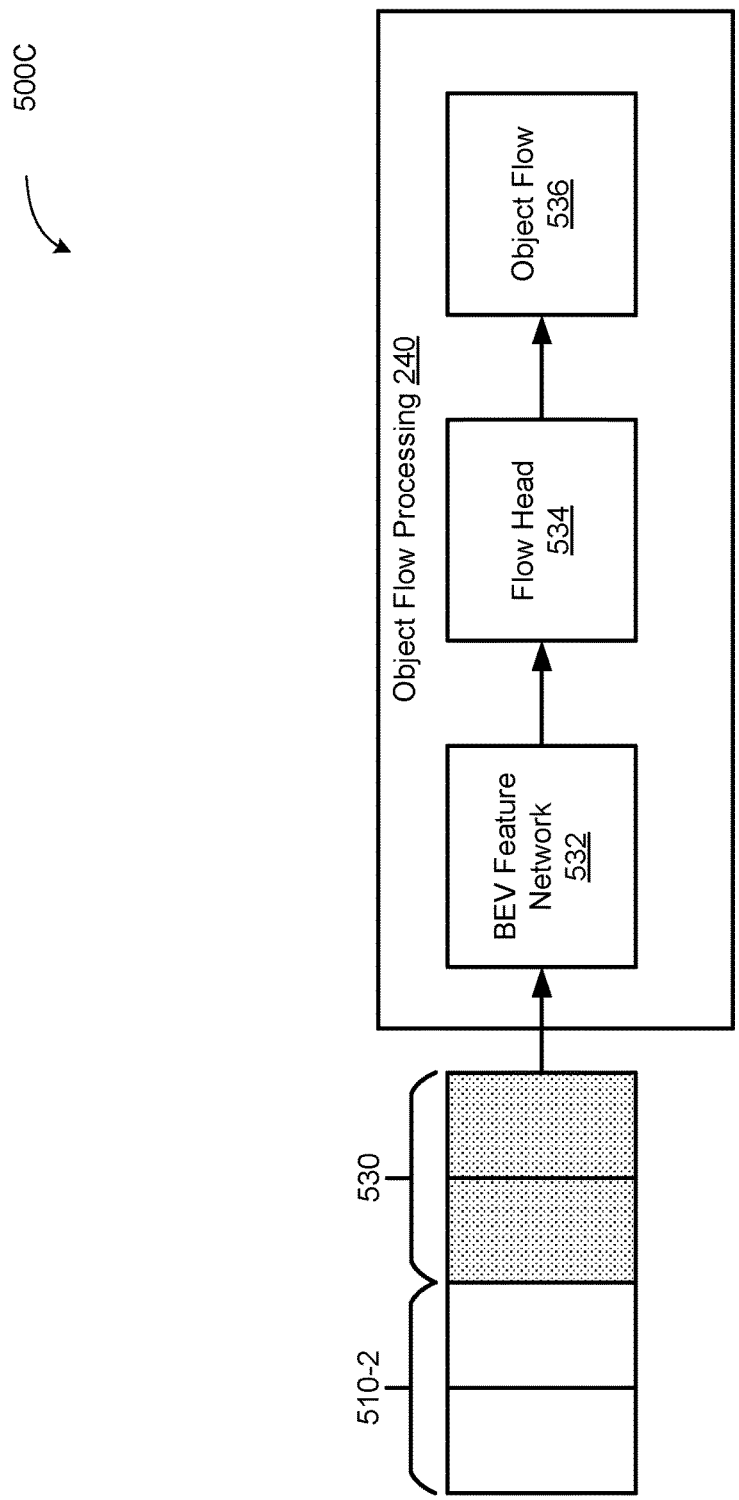

FIG. 5C is a diagram illustrating an example multi-frame flow model architecture ("architecture") 500C, in accordance with some implementations of the present disclosure.

The architecture 500C can be used to perform dense motion estimation to determine (e.g., estimate) the speeds of objects. For example, the output of the architecture 500C can be used to determine motion vectors (e.g., velocity vectors) to determine object flow. The dense motion estimation can allow objects observed within the driving environment to be classified among any known classes of object as well as an "unknown object" class (e.g., based on the object's pattern of motion). An unknown object's motion can be tracked until the object is safely out of the driving environment.

As shown, the set of BEV features 510-2 and the set of warped BEV features 530 described above with reference to FIG. 5A can be combined to form a set of aggregated BEV features. In this illustrative example, the set of BEV features 510-2 and the set of warped BEV features 530 are concatenated to generate a set of concatenation-based BEV features. In alternative implementations, the set of BEV features 510-2 and the set of warped BEV features 530 are combined to generate a set of summation-based BEV features (e.g., as described above with reference to FIG. 4B). In alternative implementations, the set of BEV features 510-2 and the set of warped BEV features 530 are combined to generate a set of transformer-based BEV features (e.g., as described above with reference to FIG. 4C).

As further shown, the architecture 500C can further include the object flow processing component 240. More specifically, the object flow processing component 240 can include a BEV feature network 532 and a flow head 534. The BEV feature network 532 can receive the set of aggregated BEV features, and extract features from the set of aggregated BEV features. The features extracted by the BEV feature network 532 can be provided to the flow head 534 to generate an object flow 536.

FIG. 6 is a flow diagram illustrating an example method of implementing multi-frame temporal aggregation and dense motion estimation for autonomous vehicles (AVs), in accordance with some implementations of the present disclosure. A processing device, having one or more processing units (CPUs) and memory devices communicatively coupled to the CPU(s), can perform method 600 and/or each of their individual functions, routines, subroutines, or operations. The processing device executing method 600 can perform instructions issued by various components of the sensing system 110 or data processing system 120 of FIG. 1, e.g., EEPM 132. In some implementations, method 600 can be directed to systems and components of an autonomous driving vehicle, such as the autonomous vehicle 100 of FIG. 1. In some implementations, method 600 can be performed by EEPM 132, or any other similar model, which may be a part of a perception system of an autonomous vehicle, a vehicle that deploys driver assistance technology, or a part of any other application platform that uses object detection and classification.

Method 600 can be used to improve performance of the data processing system 120 and/or the AVCS 140. In certain implementations, a single processing thread can perform method 600. Alternatively, two or more processing threads can perform method 600, each thread executing one or more individual functions, routines, subroutines, or operations of method 600. In an illustrative example, the processing threads implementing method 600 can be synchronized (e.g., using semaphores, critical sections, and/or other thread synchronization mechanisms). Alternatively, the processing threads implementing method 600 can be executed asynchronously with respect to each other. Various operations of method 600 can be performed in a different order compared with the order shown in FIG. 6. Some operations of method 600 can be performed concurrently with other operations. Some operations can be optional.

At operation 610, processing logic obtains input data associated with a plurality of timesteps. For example, the plurality of timesteps can include a current timestep (1) and at least one timestep prior to the current timestep (e.g., 1-1). The input data can include camera data and radar data. More specifically, the camera data can be obtained from one or more cameras associated with an autonomous vehicle (AV). The input data can include a plurality of images of a driving environment of the AV, where each image of the plurality of images corresponds to a respective timestep of the plurality of timesteps. Further details regarding obtaining the input data are described above with reference to FIG. 2.

At operation 620, processing logic extracts, from the input data, a plurality of sets of BEV features. Each set of BEV features of the plurality of sets of features corresponds to a respective timestep of the plurality of timesteps. In some implementations, each set of BEV features of the plurality of sets of BEV features includes a respective feature vector. Further details regarding extracting the set of BEV features are described above with reference to FIG. 2.

At operation 630, processing logic generates, using the plurality of sets of features, an object flow for at least one object. In some implementations, generating the object flow includes performing multi-frame temporal aggregation. More specifically, performing multi-frame temporal aggregation can include generating a set of aggregated BEV features from the plurality of BEV features. For example, performing multi-frame temporal aggregation can include warping a first set of features corresponding to a first timestep to generate a set of warped BEV features, and combining the set of warped BEV features with a second set of features correspond to a second timestep subsequent to the first timestep.

In some implementations, performing multi-frame temporal aggregation includes generating the set of aggregated BEV features as a set of concatenation-based BEV features by concatenating the set of warped BEV features and the second set of features. Further details regarding generating the set of aggregated BEV features as a set of concatenation-based BEV features described above with reference to FIG. 4A and will be described in further detail below with reference to FIG. 7

In some implementations, performing multi-frame temporal aggregation includes generating the set of aggregated BEV features as a set of summation-based BEV features. Further details regarding generating the set of aggregated BEV features as a set of summation-based BEV features described above with reference to FIG. 4B and will be described in further detail below with reference to FIG. 7.

In some implementations, performing multi-frame temporal aggregation includes generating the set of aggregated BEV features as a set of transformer-based BEV features. Further details regarding generating the set of aggregated BEV features as a set of transformer-based BEV features described above with reference to FIG. 4C and will be described in further detail below with reference to FIG. 7.

Additionally or alternatively, in some implementations, generating the object flow includes performing, using the plurality of sets of features, multi-frame dense motion estimation. More specifically, performing multi-frame dense motion estimation can include generating at least one object flow of at least one object identified from the camera data. Further details regarding performing multi-frame dense motion estimation are described above with reference to FIGS. 5A-5B and will be described in further detail below with reference to FIGS. 8A-8B.

At operation 640, processing logic can cause a driving path to be modified in view of at least one output. More specifically, the at least one output can include at least one of: the set of aggregated BEV features or the at least one object flow. For example, the at least one output can be processed by the data processing system of the AV (e.g., the data processing system 120), and the result of the processing by the data processing system can be provided to the AVCS of the AV (e.g., AVCS 140) to control the driving path of the AV. Further details regarding causing a driving path to be modified in view of at least one output are described above with reference to FIG. 1.

Figure 7:
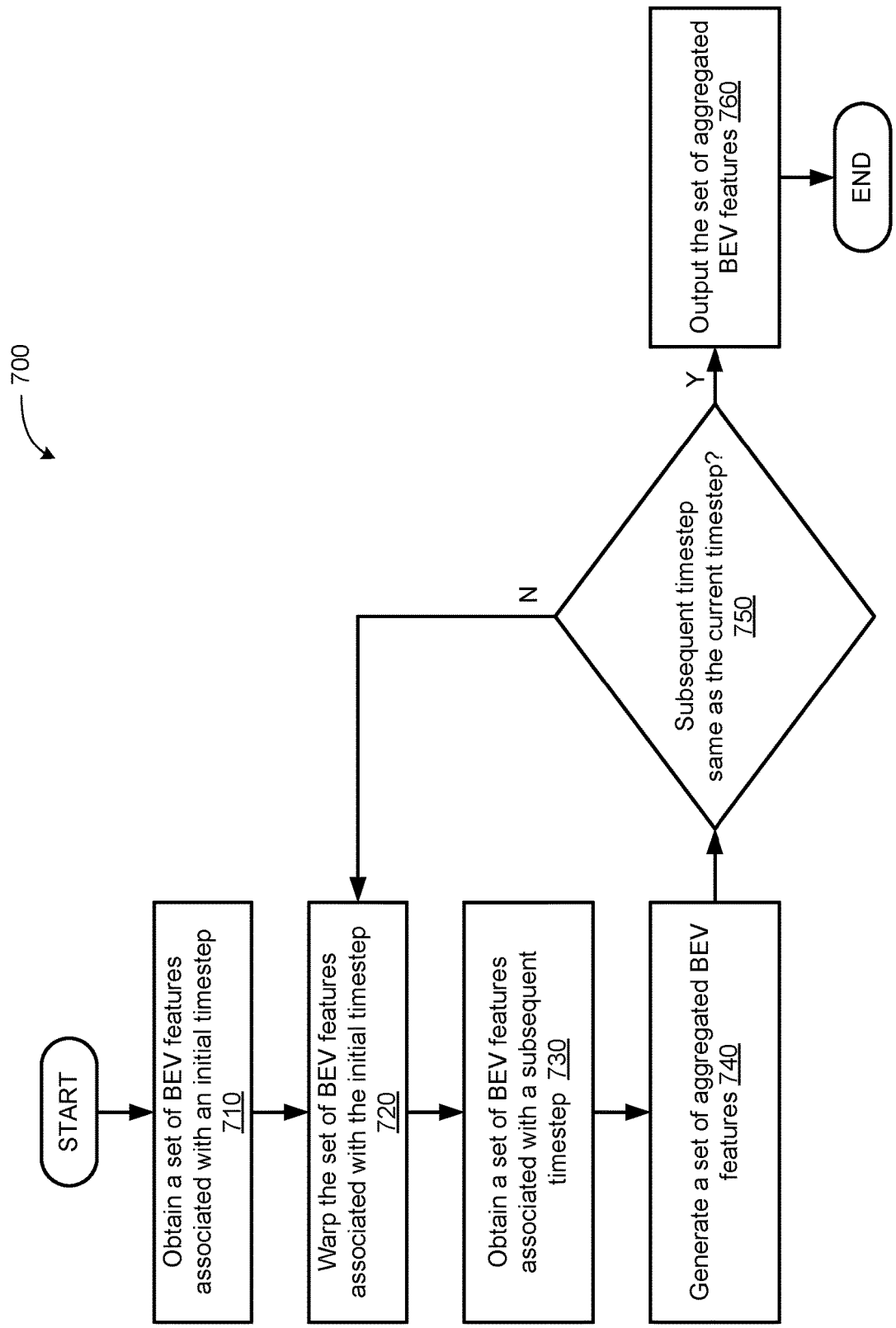
FIG. 7 illustrates an example method of implementing multi-frame temporal aggregation for autonomous vehicles (AVs), in accordance with some implementations of the present disclosure.

FIG. 7 illustrates an example method 700 of performing multi-frame temporal aggregation, in accordance with some implementations of the present disclosure. A processing device, having one or more processing units (CPUs) and memory devices communicatively coupled to the CPU(s), can perform method 700 and/or each of their individual functions, routines, subroutines, or operations. The processing device executing method 700 can perform instructions issued by various components of the sensing system 110 or data processing system 120 of FIG. 1, e.g., EEPM 132. In some implementations, method 700 can be directed to systems and components of an autonomous driving vehicle, such as the autonomous vehicle 100 of FIG. 1. In some implementations, method 700 can be performed by EEPM 132, or any other similar model, which may be a part of a perception system of an autonomous vehicle, a vehicle that deploys driver assistance technology, or a part of any other application platform that uses object detection and classification.

Method 700 can be used to improve performance of the data processing system 120 and/or the AVCS 140. In certain implementations, a single processing thread can perform method 700. Alternatively, two or more processing threads can perform method 700, each thread executing one or more individual functions, routines, subroutines, or operations of method 700. In an illustrative example, the processing threads implementing method 700 can be synchronized (e.g., using semaphores, critical sections, and/or other thread synchronization mechanisms). Alternatively, the processing threads implementing method 700 can be executed asynchronously with respect to each other. Various operations of method 700 can be performed in a different order compared with the order shown in FIG. 7. Some operations of method 700 can be performed concurrently with other operations. Some operations can be optional.

At operation 710, processing logic obtains a set of BEV features associated with an initial timestep. More specifically, the initial timestep can be an initial timestep of a sequence of timesteps ranging from the initial timestep to a current timestep. Illustratively, if the current timestep is t, then the initial timestep can be defined as t−m, where m is a positive integer.

At operation 720, processing logic warps the set of BEV features to generate a set of warped BEV features. Further details regarding warping the set of BEV features are described above.

At operation 730, processing logic obtains a set of BEV features associated with a subsequent timestep. For example, the subsequent timestep can be a timestep that immediately follows the initial timestep in the sequence of timesteps. Illustratively, if the initial timestep is defined as t−m, then the subsequent timestep can be defined as (t−m)+1.

At operation 740A, processing logic generates a set of aggregated BEV features. The set of aggregated BEV features can be generated by combining the set of BEV features associated with the subsequent timestep with the set of warped BEV features generated from the set of BEV features associated with the initial timestep.

In some embodiments, generating the set of aggregated BEV features includes generating a set of concatenation-based BEV features. More specifically, generating the set of concatenation-based BEV features includes concatenating the set of BEV features associated with the subsequent timestep with the set of warped BEV features. Further details regarding generating a set of concatenation-based BEV features are described above with reference to FIG. 4A.

In some embodiments, generating the set of aggregated BEV features includes generating a set of summation-based BEV features. More specifically, generating the set of summation-based BEV features includes summing the set of BEV features associated with the subsequent timestep and the set of warped BEV features. Further details regarding generating a set of summation-based BEV features are described above with reference to FIG. 4B.

In some embodiments, generating the set of aggregated BEV features includes generating a set of transformer-based BEV features. More specifically, generating the set of transformer-based BEV features includes transforming the set of warped BEV features to obtain a transformed set of warped BEV features, transforming the second set of BEV features to obtain a transformed second set of BEV features, and summing the transformed set of warped BEV features and the transformed second set of BEV features. Further details regarding generating a set of transformer-based BEV features are described above with reference to FIG. 4C.

At operation 750, processing logic determines whether the subsequent timestep is the same as the current timestep. More specifically, determining whether the subsequent timestep is the same as the current timestep can include determining whether (t−m)+1=1 (i.e., the initial timestep is t−1). If the subsequent timestep is not the same as the current timestep, this means that the subsequent timestep is a timestep that precedes the current timestep within the sequence of timesteps. The process can revert back to operation 720A to generate a second set of warped BEV features by warping the set of aggregated BEV features (e.g., the set of concatenation-based BEV features, the set of summation-based BEV features, or the set of transformer-based BEV features).

If the subsequent timestep is the same as the current timestep, this means that there are no additional timesteps left within the sequence. At operation 760A, processing logic can output the set of aggregated BEV features. The set of aggregated BEV features can be processed, which can be used to cause a driving path to be modified (e.g., operation 650 of FIG. 6). For example, the set of aggregated BEV features can be used to cause the AVCS of the AV (e.g., AVCS 140 of FIG. 1) to control the operation of the AV.

FIG. 8A illustrates an example method 800A of performing multi-frame dense motion estimation, in accordance with some implementations of the present disclosure. A processing device, having one or more processing units (CPUs) and memory devices communicatively coupled to the CPU(s), can perform method 800A and/or each of their individual functions, routines, subroutines, or operations. The processing device executing method 800A can perform instructions issued by various components of the sensing system 110 or data processing system 120 of FIG. 1, e.g., EEPM 132. In some implementations, method 800A can be directed to systems and components of an autonomous driving vehicle, such as the autonomous vehicle 100 of FIG. 1. In some implementations, method 800A can be performed by EEPM 132, or any other similar model, which may be a part of a perception system of an autonomous vehicle, a vehicle that deploys driver assistance technology, or a part of any other application platform that uses object detection and classification.

Method 800A can be used to improve performance of the data processing system 120 and/or the AVCS 140. In certain implementations, a single processing thread can perform method 800A. Alternatively, two or more processing threads can perform method 800A, each thread executing one or more individual functions, routines, subroutines, or operations of method 800A. In an illustrative example, the processing threads implementing method 800A can be synchronized (e.g., using semaphores, critical sections, and/or other thread synchronization mechanisms). Alternatively, the processing threads implementing method 800A can be executed asynchronously with respect to each other. Various operations of method 800A can be performed in a different order compared with the order shown in FIG. 8. Some operations of method 800A can be performed concurrently with other operations. Some operations can be optional.

At operation 810A, processing logic obtains a first set of BEV features associated with a first timestep, a second set of BEV features associated with a second timestep, and an initial flow. The first timestep and the second timestep can each be timesteps of a sequence of timesteps ranging from the initial timestep to a current timestep. More specifically, the second timestep is the timestep that immediately follows the first timestep in the sequence of timesteps. Illustratively, if the current timestep is t and the first timestep is t-m, then the second timestep can be defined as (t-m)+1, where m is a positive integer.

At operation 820A, processing logic warps the first set of BEV features to generate a set of warped BEV features.

At operation 830A, processing logic generates a correlation output by performing a correlation based on the second set of BEV features and the set of warped BEV features. For example, the correlation output can be a cost volume (e.g., 4D cost volume).

At operation 840A, processing logic generates a context network output from the second set of BEV features.

At operation 850A, processing logic generates, using the initial flow, the correlation output and the context network output, a final flow. For example, the context network output can be provided to a GRU. The output of the GRU can be combined with the initial flow (e.g., summed) to generate a modified flow. The correlation output (e.g., the cost volume) can be provided to a lookup component to generate a lookup output. The output of the GRU and the lookup output can be provided as input to a next GRU. The output of the next GRU can be combined with the modified flow to obtain a second modified flow. A similar process can be performed until reaching a final GRU. The output of the final GRU can be combined with a penultimate modified flow to obtain the final flow (i.e., object flow). The final flow can be processed, which can be used to cause a driving path to be modified (e.g., operation 650 of FIG. 6). For example, final flow can be used to cause the AVCS of the AV (e.g., AVCS 140 of FIG. 1) to control the operation of the AV. Further details regarding operations 810A-850A are described above with reference to FIGS. 5A-5B.

Figure 8B:
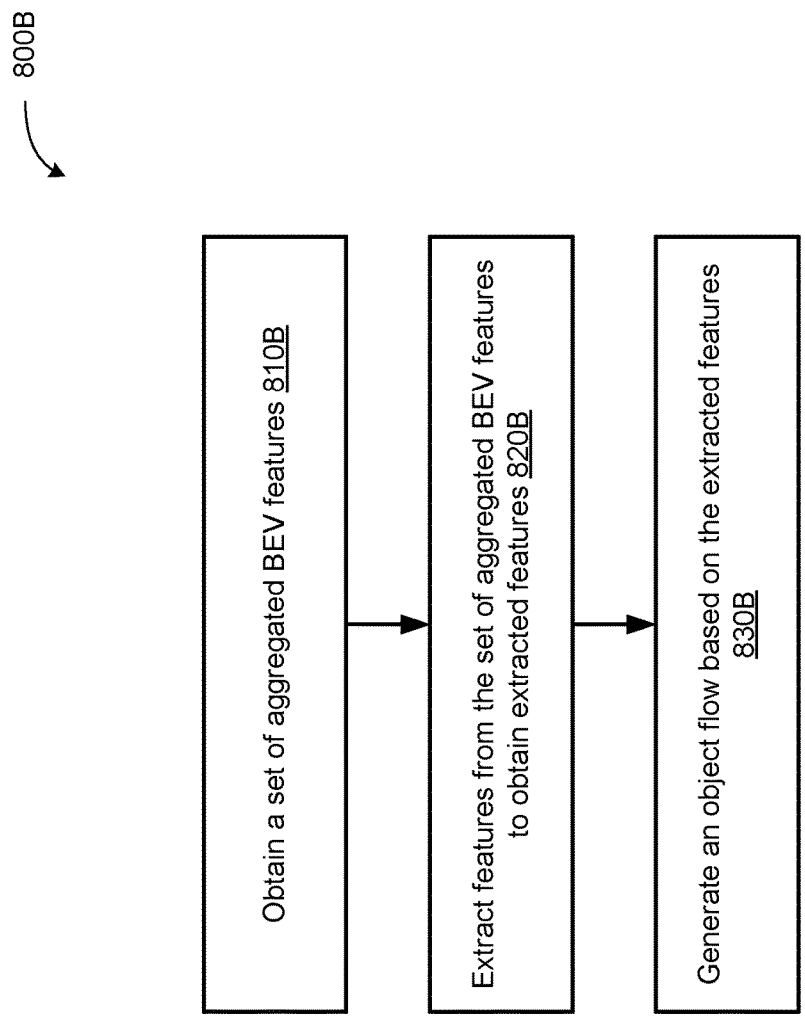

FIG. 8B illustrates an example method 800B of performing multi-frame dense motion estimation, in accordance with some implementations of the present disclosure. A processing device, having one or more processing units (CPUs) and memory devices communicatively coupled to the CPU(s), can perform method 800B and/or each of their individual functions, routines, subroutines, or operations. The processing device executing method 800B can perform instructions issued by various components of the sensing system 110 or data processing system 120 of FIG. 1, e.g., EEPM 132. In some implementations, method 800B can be directed to systems and components of an autonomous driving vehicle, such as the autonomous vehicle 100 of FIG. 1. In some implementations, method 800B can be performed by EEPM 132, or any other similar model, which may be a part of a perception system of an autonomous vehicle, a vehicle that deploys driver assistance technology, or a part of any other application platform that uses object detection and classification.

Method 800B can be used to improve performance of the data processing system 120 and/or the AVCS 140. In certain implementations, a single processing thread can perform method 800B. Alternatively, two or more processing threads can perform method 800B, each thread executing one or more individual functions, routines, subroutines, or operations of method 800B. In an illustrative example, the processing threads implementing method 800B can be synchronized (e.g., using semaphores, critical sections, and/or other thread synchronization mechanisms). Alternatively, the processing threads implementing method 800B can be executed asynchronously with respect to each other. Various operations of method 800B can be performed in a different order compared with the order shown in FIG. 8. Some operations of method 800B can be performed concurrently with other operations. Some operations can be optional.

At operation 810B, processing logic obtains a set of aggregated BEV features. For example, the set of aggregated BEV features can be generated by combining a first set of BEV features associated with a first timestep with a second set of BEV features associated with a second timestep. More specifically, the first set of BEV features can be a set of warped BEV features generated by warping a set of BEV features. For example, the first timestep can be a timestep immediately preceding a current timestep, and the second timestep can be the current timestep. Illustratively, if the current timestep is t, then the first timestep can be t−1. However, such an example should not be considered limiting.

In some embodiments, the set of aggregated BEV features includes a set of concatenation-based BEV features. Further details regarding the set of concatenation-based BEV features are described above with reference to FIGS. 4A and 7. In some embodiments, the set of aggregated BEV features includes a set of summation-based BEV features. Further details regarding the set of summation-based BEV features are described above with reference to FIGS. 4B and 7. In some embodiments, the set of aggregated BEV features includes a set of transformer-based BEV features. Further details regarding the set of transformer-based BEV features are described above with reference to FIGS. 4C and 7.

At operation 820B, processing logic extracts features from the set of aggregated BEV features to obtain extracted features. For example, the features can be extracted using a BEV feature network (e.g., BEV backbone).

At operation 830B, processing logic generates an object flow based on the extracted features. The object flow can be processed, which can be used to cause a driving path to be modified (e.g., operation 650 of FIG. 6). For example, object flow can be used to cause the AVCS of the AV (e.g., AVCS 140 of FIG. 1) to control the operation of the AV. Further details regarding operations 810B-830B are described above with reference to FIG. 5C.

Figure 9:
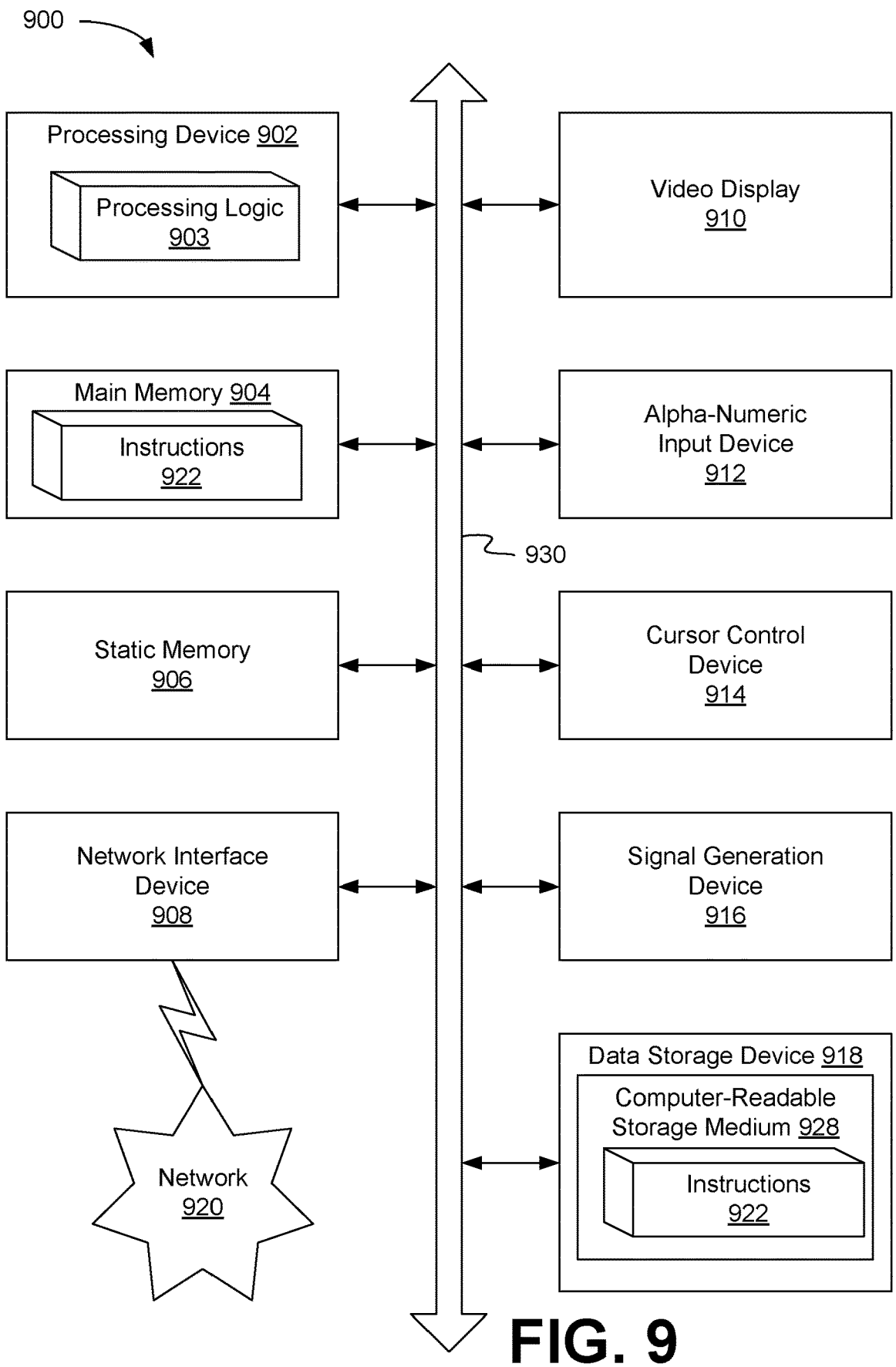
FIG. 9 depicts a block diagram of an example computer device capable of implementing multi-frame temporal aggregation and dense motion estimation for autonomous vehicles (AVs), in accordance with some implementations of the present disclosure.

FIG. 9 depicts a block diagram of an example computer device 900 capable of implementing multi-frame temporal aggregation and dense motion estimation for autonomous vehicles (AVs), in accordance with some implementations of the present disclosure. Example computer device 900 can be connected to other computer devices in a LAN, an intranet, an extranet, and/or the Internet. Computer device 900 can operate in the capacity of a server in a client-server network environment. Computer device 900 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 900 can include a processing device 902 (also referred to as a processor or CPU), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 918), which can communicate with each other via a bus 930.

Processing device 902 (which can include processing logic 903) represents one or more general-purpose processing devices such as a microprocessor, central processing unit, or the like. More particularly, processing device 902 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 902 can be configured to execute instructions performing one or more of the methods 600-800 of FIGS. 6-8.

Example computer device 900 can further comprise a network interface device 608, which can be communicatively coupled to a network 920. Example computer device 900 can further comprise a video display 910 (e.g., a liquid crystal display (LCD), a touch screen, or a cathode ray tube (CRT)), an alphanumeric input device 912 (e.g., a keyboard), a cursor control device 914 (e.g., a mouse), and an acoustic signal generation device 916 (e.g., a speaker).

Data storage device 918 can include a computer-readable storage medium (or, more specifically, a non-transitory computer-readable storage medium) 928 on which is stored one or more sets of executable instructions 922. In accordance with one or more aspects of the present disclosure, executable instructions 922 can comprise executable instructions performing one or more of the methods 600-800 FIGS. 6-8.

Executable instructions 922 can also reside, completely or at least partially, within main memory 904 and/or within processing device 902 during execution thereof by example computer device 900, main memory 904 and processing device 902 also constituting computer-readable storage media. Executable instructions 922 can further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "obtaining," "generating," "providing," "causing," "transforming," "fusing," "selecting," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMS, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   obtaining, by a processing device, input data derived from a set of sensors associated with an autonomous vehicle (AV), wherein the input data comprises camera data and radar data comprising a plurality of frames each associated with a timestep;
   extracting, by the processing device from the input data, a plurality of sets of bird's-eye view (BEV) features, wherein each set of BEV features corresponds to a respective timestep associated with a respective frame;
   generating, by the processing device from the plurality of sets of BEV features, an object flow for at least one object, wherein generating the object flow comprises performing at least one of:
      multi-frame temporal aggregation of sets of BEV features to aggregate at least a first set of BEV features corresponding to a current timestep associated with a first frame and a second set of BEV features corresponding to a prior timestep associated with a second frame, or
      multi-frame dense motion estimation for identification of at least one object of an unknown class; and
   causing, by the processing device, a driving path of the AV to be modified in view of the object flow.

2. The method of claim 1, wherein performing the multi-frame temporal aggregation further comprises:
   obtaining the first set of BEV features corresponding to a first timestep and the second set of BEV features corresponding to the prior timestep preceding the first timestep;
   warping the second set of BEV features to obtain a set of warped BEV features;
   generating a set of aggregated BEV features;
   determining whether the first timestep is the current timestep; and
   in response to determining that the first timestep is the current timestep, outputting the set of aggregated BEV features for generating the object flow.

3. The method of claim 2, wherein generating the set of aggregated BEV features further comprises concatenating the warped set of BEV features and the first set of BEV features.

4. The method of claim 2, wherein generating the set of aggregated BEV features further comprises summing the warped set of BEV features and the first set of BEV features based on a constant per-grid cell weight.

5. The method of claim 2, wherein generating the set of aggregated BEV features further comprises summing the warped set of BEV features and the first set of BEV features based on a weight determined by a transformer.

6. The method of claim 1, wherein performing the multi-frame dense motion estimation further comprises:
   obtaining the first set of BEV features corresponding to a first timestep and the second set of BEV feature corresponding to the prior timestep preceding the first timestep;
   warping the second set of BEV features to generate a set of warped BEV features;
   generating a correlation output by performing a correlation based on the first set of BEV features and the set of warped BEV features;
   generating, from the first set of BEV features, a context network output; and
   generating, using the correlation output, the context network output and an initial flow, a final flow corresponding to the object flow.

7. The method of claim 1, wherein performing the multi-frame dense motion estimation further comprises:
   obtaining a set of aggregated BEV features;
   extracting features from the set of aggregated BEV features to obtain extracted features; and
   generating the object flow based on the extracted features.

8. A system comprising:
   a memory; and
   a processing device communicative coupled to the memory, the processing device configured to:
      obtain input data derived from a set of sensors associated with an autonomous vehicle (AV), wherein the input data comprises camera data and radar data comprising a plurality of frames each associated with a timestep;
      extract, from the input data, a plurality of sets of bird's-eye view (BEV) features, wherein each set of BEV features corresponds to a respective timestep associated with a respective frame;
      generate, from the plurality of sets of BEV features, an object flow for at least one object, wherein to generate the object flow, the processing device is configured to perform at least one of:
         multi-frame temporal aggregation of sets of BEV features to aggregate at least a first set of BEV features corresponding to a current timestep associated with a first frame and a second set of BEV features corresponding to a prior timestep associated with a second frame, or
         multi-frame dense motion estimation for identification of at least one object of an unknown class; and
      cause a driving path of the AV to be modified in view of the object flow.

9. The system of claim 8, wherein, to perform the multi-frame temporal aggregation, the processing device is further configured to:
   obtain the first set of BEV features corresponding to a first timestep and the second set of BEV features corresponding to the prior timestep preceding the first timestep;
   warp the second set of BEV features to obtain a set of warped BEV features;
   generating a set of aggregated BEV features;
   determine whether the first timestep is the current timestep; and in response to determining that the first timestep is the current timestep, output the set of aggregated BEV features for generating the object flow.

10. The system of claim 9, wherein the set of aggregated BEV features is generated by concatenating the set of warped BEV features and the first set of BEV features.

11. The system of claim 9, wherein the set of aggregated BEV features is generated by summing the warped set of BEV features and the first set of BEV features based on a constant per-grid cell weight.

12. The system of claim 9, wherein the set of aggregated BEV features is generated by summing the warped set of BEV features and the first set of BEV features based on a weight determined by a transformer.

13. The system of claim 12, wherein, to perform the multi-frame dense motion estimation, the processing device is further configured to:
   obtain a set of aggregated BEV features;
   extract features from the set of aggregated BEV features to obtain extracted features; and
   generate the object flow based on the extracted features.

14. The system of claim 8, wherein, to perform the multi-frame dense motion estimation, the processing device is further configured to:
   obtain the first set of BEV features corresponding to a first timestep and the second set of BEV features corresponding to the prior timestep preceding the first timestep;
   warp the second set of BEV features to generate a set of warped BEV features;
   generate a correlation output by performing a correlation based on the first set of BEV features and the set of warped BEV features;
   generate, from the first set of BEV features, a context network output; and
   generate, using the correlation output, the context network output and an initial flow, a final flow corresponding to the object flow.

15. A non-transitory computer-readable storage medium having instructions stored thereon that, when executed by a processing device, cause the processing device to perform operations comprising:
   obtaining input data derived from a set of sensors associated with an autonomous vehicle (AV), wherein the input data comprises camera data and radar data comprising a plurality of frames each associated with a timestep;
   extracting, from the input data, a plurality of sets of bird's-eye view (BEV) features, wherein each set of BEV features corresponds to a respective timestep associated with a respective frame;
   generating, from the plurality of sets of BEV features, an object flow for at least one object, wherein generating the object flow comprises performing at least one of:
      multi-frame temporal aggregation of sets of BEV features to aggregate at least a first set of BEV features corresponding to a current timestep associated with a first frame and a second set of BEV features corresponding to a prior timestep associated with a second frame, or
      multi-frame dense motion estimation for identification of at least one object of an unknown class; and
   causing a driving path of the AV to be modified in view of the object flow.

16. The non-transitory computer-readable storage medium of claim 15, wherein performing the multi-frame temporal aggregation further comprises:
   obtaining the first set of BEV features corresponding to a first timestep and the second set of BEV features corresponding to the prior timestep preceding the first timestep;
   warping the second set of BEV features to obtain a set of warped BEV features;
   generating a set of aggregated BEV features;
   determining whether the first timestep is the current timestep; and
   in response to determining that the first timestep is the current timestep, outputting the set of aggregated BEV features for generating the object flow.

17. The non-transitory computer-readable storage medium of claim 16, wherein generating the set of aggregated BEV features further comprises concatenating the warped set of BEV features and the first set of BEV features.

18. The non-transitory computer-readable storage medium of claim 16, wherein generating the set of aggregated BEV features further comprises summing the warped set of BEV features and the first set of BEV features based on a constant per-grid cell weight.

19. The non-transitory computer-readable storage medium of claim 16, wherein generating the set of aggregated BEV features further comprises summing the warped set of BEV features and the first set of BEV features based on a weight determined by a transformer.

20. The non-transitory computer-readable storage medium of claim 15, wherein performing the multi-frame dense motion estimation further comprises:
   obtaining the first set of BEV features corresponding to a first timestep and the second set of BEV features corresponding to the prior timestep preceding the first timestep;
   warping the second set of BEV features to generate a set of warped BEV features;
   generating a correlation output by performing a correlation based on the first set of BEV features and the set of warped BEV features;
   generating, from the first set of BEV features, a context network output; and
   generating, using the correlation output, the context network output and an initial flow, a final flow corresponding to the object flow.

* * * * *